(12) United States Patent
Bullis et al.

(10) Patent No.: US 7,346,062 B2
(45) Date of Patent: Mar. 18, 2008

(54) APPARATUS AND METHOD TO COORDINATE CALENDAR SEARCHES IN A NETWORK SCHEDULER GIVEN LIMITED RESOURCES

(75) Inventors: Bryan K. Bullis, Apex, NC (US); Darryl J. Rumph, Cary, NC (US); Michael S. Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 10/617,095

(22) Filed: Jul. 10, 2003

(65) Prior Publication Data

US 2005/0008021 A1 Jan. 13, 2005

(51) Int. Cl.
*H04L 12/56* (2006.01)
*H04J 3/00* (2006.01)

(52) U.S. Cl. .............................. 370/395.4; 370/395.31; 370/498

(58) Field of Classification Search ................................. 370/395.31–395.32, 395.4–395.41, 412–419
See application file for complete search history.

(56) References Cited

U.S. PATENT DOCUMENTS

| | | | |
|---|---|---|---|
| 6,742,107 B2 * | 5/2004 | Jinzaki | 712/200 |
| 7,020,657 B2 * | 3/2006 | Rumph | 707/101 |
| 2003/0058868 A1 * | 3/2003 | Bullis et al. | 370/395.4 |
| 2003/0227925 A1 * | 12/2003 | Matsuo et al. | 370/395.32 |

* cited by examiner

*Primary Examiner*—Chi Pham
*Assistant Examiner*—Tri H. Phan
(74) *Attorney, Agent, or Firm*—Joscelyn G. Cockburn

(57) ABSTRACT

A system that indicates which frame should next be removed by a scheduler from flow queues within a network device, such as a router, network processor, and like devices is disclosed. The system includes a search engine that searches a set of calendars under the control of a Finite State Machine (FSM), a current pointer, and input signals from an array and a clock line providing current time. Also included is a decision block that determines which of the searches are critical and which, during peak calendar search periods, can be postponed with minimal impact to the system. The postponed searches are then conducted at a time when there is available calendar search capacity.

2 Claims, 22 Drawing Sheets

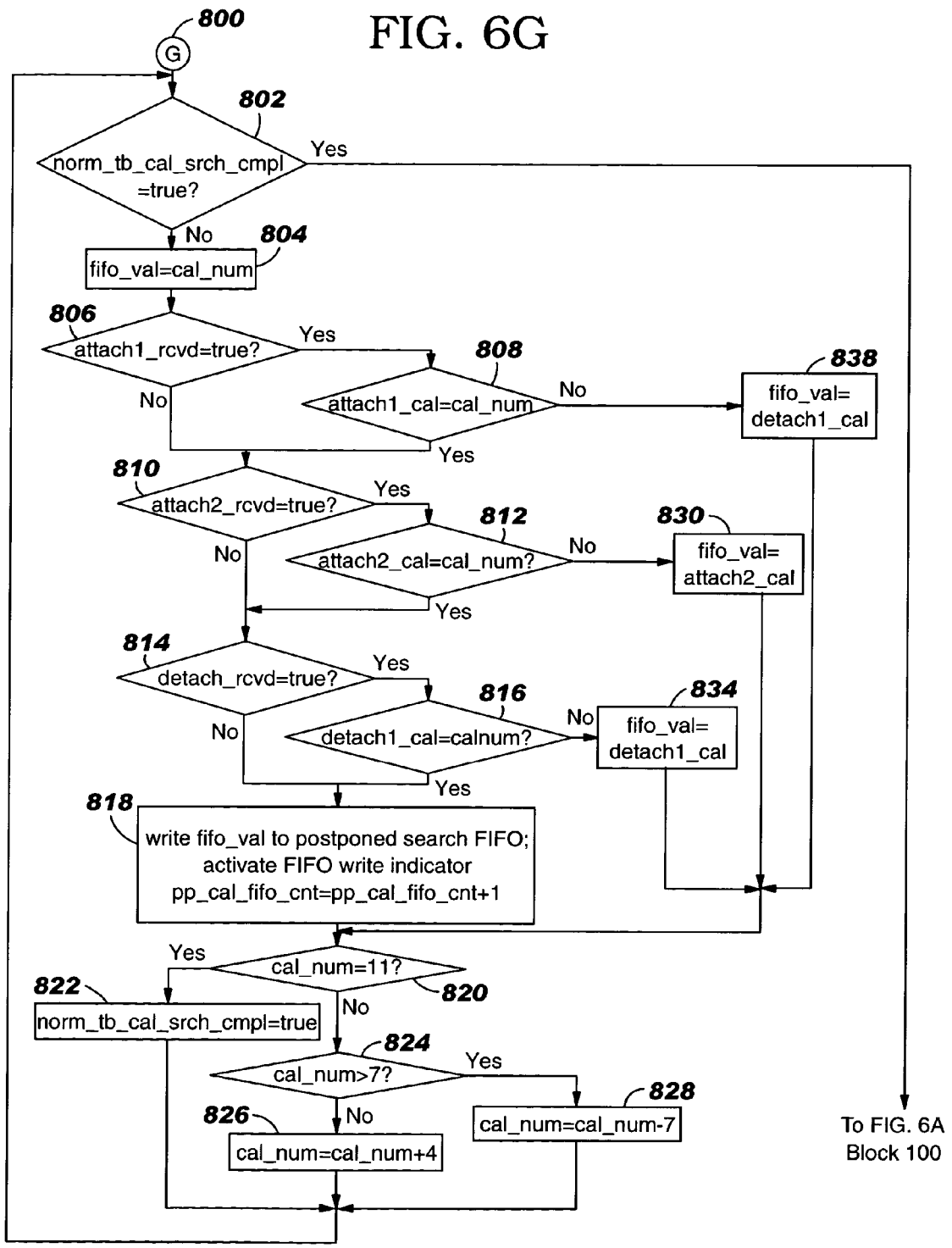

FIG. 9

TABLE I. Initialization

| Clock Cycle Number | Array Location | Array Name(s) | Access Type | Write Data |
|---|---|---|---|---|
| 1 | 0 | Calendar Status<br>CP<br>Winner Valid | Write<br>Write<br>Write | All Zeroes<br>All Zeroes<br>Zero |
| 2 | 1 | Calendar Status<br>CP<br>Winner Valid | Write<br>Write<br>Write | All Zeroes<br>All Zeroes<br>Zero |
| 3 | 2 | Calendar Status<br>CP<br>Winner Valid | Write<br>Write<br>Write | All Zeroes<br>All Zeroes<br>Zero |
| 4 | 3 | Calendar Status<br>CP<br>Winner Valid | Write<br>Write<br>Write | All Zeroes<br>All Zeroes<br>Zero |
| . | . | Calendar Status<br>CP<br>Winner Valid | Write<br>Write<br>Write | All Zeroes<br>All Zeroes<br>Zero |
| . | . | Calendar Status<br>CP<br>Winner Valid | Write<br>Write<br>Write | All Zeroes<br>All Zeroes<br>Zero |
| . | . | Calendar Status<br>CP<br>Winner Valid | Write<br>Write<br>Write | All Zeroes<br>All Zeroes<br>Zero |
| 50 | 49 | Calendar Status<br>CP<br>Winner Valid | Write<br>Write<br>Write | All Zeroes<br>All Zeroes<br>Zero |
| 51 | 50 | Calendar Status<br>CP<br>Winner Valid | Write<br>Write<br>Write | All Zeroes<br>All Zeroes<br>Zero |
| 52 | 51 | Calendar Status<br>CP<br>Winner Valid | Write<br>Write<br>Write | All Zeroes<br>All Zeroes<br>Zero |

FIG. 10

TABLE II. Search Sequence with Neither Attaches Nor Detaches

| Clock Cycl Number | Array Location | Array Name(s) | Access Type | Write Data | Search Engine Inputs | Search Engine Output |
|---|---|---|---|---|---|---|
| 1 | 0 | Calendar Status | Read | N/A | N/A | N/A |
| 1 | 0 | CP | Read | N/A | N/A | N/A |
| 2 | 1 | Calendar Status | Read | N/A | Calendar 0 Status | N/A |
| 2 | 1 | CP | Read | N/A | Calendar 0 CP Time-based search | N/A |
| 3 | 2 | Calendar Status | Read | N/A | Calendar 1 Status | Calendar 0 Search |
| 3 | 2 | CP | Read | N/A | Calendar 1 CP | |
| 3 | 0 | Winner Valid | Write | Search Engine Winner_Valid Output | Time-based Search | |
| 3 | 0 | Winning Location | Write | Search Engine Winning_Location Output | | |
| 4 | 3 | Calendar Status | Read | N/A | Calendar 2 Status | Calendar 1 Search |
| 4 | 3 | CP | Read | N/A | Calendar 2 CP | |
| 4 | 1 | Winner Valid | Write | Search Engine Winner_Valid Output | Time-based Search | |
| 4 | 1 | Winning Location | Write | Search Engine Winning_Location Output | | |
| 5 | 4 | Calendar Status | Read | N/A | Calendar 3 Status | Calendar 2 Search |
| 5 | 4 | CP | Read | N/A | Calendar 3 CP | |
| 5 | 2 | Winner Valid | Write | Search Engine Winner_Valid Output | Time-based Search | |
| 5 | 2 | Winning Location | Write | Search Engine Winning_Location Output | | |
| 6 | 5 | Calendar Status | Read | N/A | Calendar 4 Status | Calendar 3 Search |

FIG. 10 (cont'd)

TABLE II (cont'd)

| | | | | |
|---|---|---|---|---|
| 6 | 5 | CP | Read | N/A | Calendar 4 CP |
| 6 | 3 | Winner Valid | Write | Search Engine Winner_Valid Output | Time-based Search |
| 6 | 3 | Winning Location | Write | Search Engine Winning_Location Output | |
| 7 | 6 | Calendar Status | Read | N/A | Calendar 5 Status | Calendar 4 Search |
| 7 | 6 | CP | Read | N/A | Calendar 5 CP | |
| 7 | 4 | Winner Valid | Write | Search Engine Winner_Valid Output | Time-based Search | |
| 7 | 4 | Winning Location | Write | Search Engine Winning_Location Output | | |
| 8 | 7 | Calendar Status | Read | N/A | Calendar 6 Status | Calendar 5 Search |
| 8 | 7 | CP | Read | N/A | Calendar 6 CP | |
| 8 | 5 | Winner Valid | Write | Search Engine Winner_Valid Output | Time-based Search | |
| 8 | 5 | Winning Location | Write | Search Engine Winning_Location Output | | |
| . . . | | | | | | |
| 12 | 11 | Calendar Status | Read | N/A | Calendar 10 Status | Calendar 9 Search |
| 12 | 11 | CP | Read | N/A | Calendar 10 CP | |
| 12 | 9 | Winner Valid | Write | Search Engine Winner_Valid Output | Time-based Search | |
| 12 | 9 | Winning Location | Write | Search Engine Winning_Location Output | | |
| 13 | N/A | Calendar Status | Read | N/A | Calendar 11 Status | Calendar 10 Search |
| 13 | N/A | CP | Read | N/A | Calendar 11 CP | |
| 13 | 10 | Winner Valid | Write | Search Engine Winner_Valid Output | Time-based Search | |
| 13 | 10 | Winning Location | Write | Search Engine Winning_Location Output | | |

FIG. 10 (cont'd)

TABLE II (cont'd)

| | | | | | | Calendar 11 Search |
|---|---|---|---|---|---|---|
| 14 | N/A | N/A | N/A | N/A | N/A | |
| 14 | N/A | Winner Valid | Write | Search Engine Winner_Valid Output | N/A | |
| 14 | 11 | Winning Location | Write | Search Engine Winning_Location Output | | |
| 14 | 11 | Winning Location | Read | N/A | N/A | Winner_Valid and Winner Info is at the output |
| 15 | 1st winner found in Winner Valid Array | | | | | |
| 16 | No Activity | | | | | |
| 17 | No Activity | | | | | |
| 18 | No Activity | | | | | |
| 19 | No Activity | | | | | |
| 20 | Winning Index | Winning location | Read | N/A | | |

FIG. 11

TABLE III. Type I Search

| Clock Cycle Number | Array Location | Array Name(s) | Access Type | Write Data | Search Engine Inputs | Search Engine Output | Comments |
|---|---|---|---|---|---|---|---|
| 1 | N | Calendar Status | Read | N/A | N/A | N/A | Cycle initiated |
| 1 | N | Winner_Valid | Read | N/A | N/A | N/A | If the Winner_valid value for location N is logic 0, the CP value that is presented to the search engine on cycle 2 will be equal to the Calendar N CT, as per the algorithm definition |
| 1 | N | CP | Read | N/A | N/A | N/A | |
| 2 | N/A | N/A | N/A | N/A | Calendar N Status<br>Calendar N CP<br>Calendar N CT<br>Time-based Search<br>No Attach<br>No Detach | N/A | First cycle of Calendar N Search, No attaches nor detaches |
| 3 | N | Winner Valid | Write | Search Engine Winner_Valid Output | N/A | Winner_Valid and Winning_Location | |
| 3 | N | Winning Location | Write | Search Engine Winning_Location Output | N/A | | |

FIG. 12

TABLE IV.  Type II Search

| Clock Cycle Number | Array Location | Array Name(s) | Access Type | Write Data | Search Engine Inputs | Search Engine Output | Comments |
|---|---|---|---|---|---|---|---|
| 1 | N | Calendar Status | Read | N/A | N/A | N/A | Cycle initiated. Calendar attach location is at input to structure |
| 1 | N | Winner_Valid | Read | N/A | N/A | N/A | If the Winner_Valid value for location N is logic 0, the CP value that is presented to the search engine on cycle 2 will be the Calendar N CT, as per the algorithm definition. If the value is logic 1, the CP_array read data will be the CP value used. (Time-based searches only) |
| 1 | N | CP | Read | N/A | N/A | N/A | |
| 2 | N/A | N/A | N/A | | Calendar N Status Calendar N CP Calendar N CT Time-based Search Attach Indication Attach Calendar and Location | | First cycle of Calendar N Search. The Search Engine takes into account that the Calendar Status does not reflect the current attach. State of the "pre-updated" attach status bit is reported to the top-level Egress Scheduler Structure |
| 3 | N | Winner Valid | Write | Search Engine Winner_Valid Output | N/A | Winner_Valid and Winning_Location | |
| 3 | N | Winning Location | Write | Search Engine Winning Location Output | N/A | | |
| 3 | N | Calendar Status | Write | Logic 1 to bit position corresponding to attach location (other bits preserved) | N/A | N/A | Calendar status now reflects the attach. |

FIG. 13

TABLE V.  Type III Search

| Clock Cycle Number | Array Location | Array Name(s) | Access Type | Write Data | Search Engine Inputs | Search Engine Output | Comments |
|---|---|---|---|---|---|---|---|
| 1 | M | Calendar Status | Read | N/A | N/A | N/A | Cycle Initiated. Calendar attach location is at input to structure |
| 1 | M | CP | Read | N/A | N/A | N/A | |
| 2 | N/A | N/A | N/A | | Calendar M Status Calendar N CP (CP Array Read Data) Non-Time-based Search Attach Indication Attach Calendar and Location | | First cycle of Calendar M Search. The Search Engine takes into account that the Calendar Status does not reflect the current attach. State of the "pre-updated" attach status bit is reported to the top-level Egress Scheduler Structure |
| 3 | M | Winner Valid | Write | Search Engine Winner_Valid Output | N/A | Winner_Valid and Winning_Location | |
| 3 | M | Winning Location | Write | Search Engine Winning_Location Output | N/A | | |
| 3 | M | Calendar Status | Write | Logic 1 to bit position corresponding to attach location (other bits preserved) | N/A | N/A | Calendar Status Array now reflects the attach. |

FIG. 14

TABLE VI. Type IV Search

| Clock Cycle Number | Array Location | Array Name(s) | Access Type | Write Data | Search Engine Inputs | Search Engine Output | Comments |
|---|---|---|---|---|---|---|---|
| 1 | N | Calendar Status | Write | Write inverse of LIBD input to location corresponding to the Calendar detach location. Other bits preserved | N/A | N/A | Cycle initiated. Calendar attach location is at input to structure |
| 2 | N | Calendar Status | Read | N/A | N/A | N/A | |
| 2 | N | Winner_Valid | Read | N/A | N/A | N/A | If the Winner_valid value for location N is logic 0, the CP value that is presented to the search engine on cycle 3 will be the Calendar N CT, as per the algorithm definition. If the value is logic 1, the CP_array read data will be the CP value used. (Time-based searches only) |
| 2 | N | CP | Read | N/A | N/A | N/A | |
| 3 | N | CP | Write | Calendar Detach Location | N/A | N/A | |
| 3 | N/A | N/A | N/A | | Calendar N Status, Calendar N CP, Calendar N CT, Time-based Search Attach Indication, Attach Calendar and Location | | First cycle of Calendar N Search. The Search Engine takes into account that the Calendar Status does not reflect the current attach. State of the "pre-updated" attach status bit is reported to the top-level Egress Scheduler Structure |
| 4 | N | Winner Valid | Write | Search Engine Winner_Valid Output | N/A | Winner_Valid and Winning_Location | |
| 4 | N | Winning Location | Write | Search Engine Winning_Location Output | N/A | | |

FIG. 15

TABLE VII. Type V Search

| Clock Cycle Number | Array Location | Array Name(s) | Access Type | Write Data | Search Engine Inputs | Search Engine Output | Comments |
|---|---|---|---|---|---|---|---|
| 1 | N | CalendarStatus | Write | Write inverse of LIBD input to location corresponding to the Calendar detach location. Other bits preserved | N/A | N/A | Cycle initiated Calendar attach location is at input to structure |
| 2 | M | CalendarStatus | Read | N/A | N/A | N/A | Cycle initiated Calendar attach location is at input to structure |
| 2 | M | CP | Read | N/A | N/A | N/A | |
| 3 | N/A | N/A | N/A | | Calendar M Status Calendar N CP (CP Array Read Data) Non-Time-based Search Attach Indication Attach Calendar and Location | | First cycle of Calendar M Search. The Search Engine takes into account that the Calendar Status does not reflect the current attach. State of the "pre-updated" attach status bits reported to the top-level Egress Scheduler Structure |
| 4 | M | Winner Valid | Write | Search Engine Winner_Valid Output | N/A | Winner_Valid and Winning_Location | |
| 4 | M | Winning Location | Write | Search Engine Winning_Location Output | N/A | | |
| 4 | M | CalendarStatus | Write | Logic 1 to bit position corresponding to attach location (other bits preserved) | N/A | N/A | Calendar Status Array now reflects the attach. |

APPARATUS AND METHOD TO COORDINATE CALENDAR SEARCHES IN A NETWORK SCHEDULER GIVEN LIMITED RESOURCES

CROSS-REFERENCE TO RELATED PATENT APPLICATIONS

The present application relates to the following patent applications, assigned to the assignee of the present invention, which are fully incorporated herein by reference:

Published Patent Application, Publication No. US-2002-0021368-A1, Publication Date: Feb. 21, 2002, filed Apr. 12, 2001 (priority date Apr. 13, 2000), Ser. No. 09/834,141, entitled "Method and System for Network Processor Scheduling Based on Service Levels";

patent application Ser. No. 09/966,304, filed Sep. 27, 2001 by Darryl J. Rumph, entitled "Configurable Hardware Scheduler Calendar Search Algorithm";

patent application Ser. No. 09/384,691, filed Aug. 27, 1999 by Brian M. Bass et al., entitled "Network Processor Processing Complex and Methods" sometimes referred to herein as the Network Processing Unit Patent or NPU patent;

patent application Ser. No. 09/546,651, filed Apr. 10, 2000, by Peter I. A. Barri et al., entitled "Method and System for Managing Congestion in a Network". This patent is sometimes referred to herein as the Flow Control Patent;

patent application Ser. No. 09/547,280, filed Apr. 11, 2000, by Marco Heddes et al., entitled "Unified method and System for Scheduling and Discarding Packets in Computer Networks". This patent is sometimes referred to herein as the Packet Discard Patent.

Patent application Ser. No. 10/242,151, filed Sep. 12, 2002, by Darryl Rumph, entitled "Scalable Hardware Scheduler Time Based Calendar Search Algorithm".

BACKGROUND OF THE INVENTION

1. Field of the Invention

The present invention relates to communication network apparatus such as is used to link information handling systems or computers of various types and capabilities and to components and methods for data processing in such an apparatus. More particular the present invention relates to schedulers used in such devices to indicate when the next packet is to be transmitted from queues within the devices.

2. Description of the Prior Art

Scheduling the transmission of packets between points within a communications device or between points in the communications device and an external transmission network is well known in the prior art. The conventional approach is to provide a plurality of queues within the device and packets to be transmitted are enqueued to selected queues. A timing device sometimes called a timing wheel or calendar is searched to determine when the next packet is to be dequeued and forwarded from the queues. The selection, queueing and dequeueing of packets are controlled by several factors collectively referred to as Quality of Service (QoS). Because the factors and QoS requirements are well known in the prior art further discussion is not warranted. Suffice it to say U.S. Pat. Nos. 5,533,020 and 6,028,843 are examples of prior art.

Even though the prior art timing devices work well for their intended purpose it is believed that as the number of network users increases and more demand is made for better or higher Quality of Service (QoS) a more practical and efficient timing device will be required.

The requirement that the timing device should be able to support more customers and at the same time provide higher QoS poses a dilemma for the designer. The designer's dilemma is based on the fact that a design that addresses or solves the increased customer problem could adversely affect QoS whereas a design that improves QoS may not necessarily handle a large number of customers.

As a general proposition the increase in customer numbers can be solved by an increase in the number of calendars used in the design. But as the number of calendars increase more time will be required to process or perform searches on the calendars. With QoS time is of the essence. So, as the processing time increases QoS tends to deteriorate. As a consequence the designer is faced with the problems of processing a relatively large number of calendars within a relatively short time interval.

Another problem is that the design should be adaptive to face changing needs of the communication marketplace. If the design is not adaptive whenever conditions, such as addition of customers, change the current design would have to be redone. A more desirable outcome is to have a design which requires minor changes to meet the new requirements. Stated another way the design should be adaptive to accommodate changes.

Many scheduler and associated timing devices are fabricated in solid logic technology. In this technology large number of circuits are fabricated on relatively small areas of silicon termed chip. Space or real estate on the chip is at a premium. As a consequence the designer is allotted a relatively small surface area in which to place the circuits needed to provide the timing function of the scheduler. The requirement to fit the design into the limited space presents another problem for the designer.

In view of the above there is a need to provide an improved timing device to schedule movement of packets within a communications network.

SUMMARY OF THE INVENTION

The present invention solves the problem by (a) performing only the critical calendar searches, and (b) in the event of there being insufficient time to perform all searches, postponing the less critical calendar searches until such a time comes that the postponed searches can be made with minimal/negligible impact to the function. By utilizing these two steps, a significant savings in chip surface area can be realized. Because a single search engine can be used to search multiple calendars; whereas without the teachings of the present invention multiple search engines would be required. Multiple search engines would consume much more chip surface area than a single search engine. Thus, one of the benefits realized is chip surface area conservation.

In the Egress Scheduler function, there are a plurality of time-based calendars. A search, per an algorithm, must be performed on each calendar at the appropriate time. More specifically, it is required that a search be performed when one or more of the inputs to the search change. The inputs to the time-based calendar search are: (1) the Calendar Status Bits, (2) the Current Working Pointer (CP), and (3) the Current Time (CT). It should be noted that there is a fixed TDM period (number of clock cycles) in which to perform the necessary calendar searches. This period is called a tick cycle. It is desirable to perform every required calendar search in one tick cycle.

One of the Calendar Status input bits will change whenever (a) a flow queue is attached to a calendar location that previously had no entries. An attach can happen during a dequeue operation when the flow queue does not go empty as a result of the dequeue. An attach can also happen during an enqueue operation to flow queue and it is determined, per the algorithm, that an attach to that calendar is necessary. One example of an attach during an enqueue operation is an enqueue to an empty flow queue. A Calendar Status input bit will also change whenever (b) a flow queue is removed (detached) from a calendar location, and this flow queue was the only one attached to this calendar location at the time of the detach. A detach occurs for each and every dequeue operation against flows attached to that calendar. In both the cases of (a) and (b) above, the updates are a function of the traffic activity, and cannot be predicted. It is possible that there may be another required update to the Calendar Status Bits on the very next tick cycle. Thus, searches due to the update of calendar status bits are considered critical and must be conducted at the time of the attach/detach in order to prevent a severe degradation of service quality.

The Current Working Pointer (CP) calendar input changes whenever a packet is dequeued from a flow queue attached to that calendar. At that time, the value of CP is changed to the value of the calendar location that was serviced during the dequeue. Searches due to a change to CP are also considered critical for the same reason as that of a Calendar Status Bit change.

The Current Time (CT) input changes on a periodic basis. Some of the time-based calendars have different CT inputs. Some calendars have more frequently changing CT values, while other calendars have a less frequent changing CT value. Regardless of the frequency of change of CT, the frequency, once chosen, is fixed, and is known.

Those calendars with a more frequently changing CT value must have the calculations performed and the results passed on at a more frequent rate than that of the less frequent changing value of CT. For example, if the value of CT changed once every second, a calculation performed 0.5 seconds later than required (1.5 seconds after CT changes) could result in a severe degradation in service quality. However, a 0.5 second calculation postponement for a value of CT that changed once every hour would have minimal, unnoticeable effects. For the example of a 0.5 second postponement for a CT that changes once per hour, the search due to CT changing is required, but not critical, and postponement of the search is acceptable. It should be noted that, for this example, there were no calendar searches performed due to CP or Calendar Status Bit changes.

For the Egress Scheduler implementation, The number of required search engines are a function of: (i) the number of system clock cycles in a tick cycle, (ii) the number of required calendar searches (worst-case) per tick cycle, and (iii) the number of clock cycles necessary for one calendar search. For example, if there are 10 system clock cycles per tick cycle 20 required calendar searches (worst-case) per tick cycle, and the search engine can perform a search in one system clock cycle, then two search engines are required to perform all the required searches in one tick cycle. If the example above were altered, and the number of required calendar searches were increased to 21, then three search engines would be required. The present invention utilizes the fact that (a) some of the required searches are time-based searches, with a very infrequent changing value of CT; and (b) the worst-case number of searches are not required on EVERY tick cycle. Using the present invention, a solution to the problem of 21 calendar searches could be reached with only two search engines.

The present invention specifically addresses the case where searches due to changes to CT are required. The invention has logic to identify the critical searches, and ensure that these searches are always conducted at the proper tick cycle. The invention also has logic to:

(a) identify the required searches due to updates to CT only,
(b) perform these searches, starting from calendars with most frequently changing CT, moving toward those calendars with the least frequently changing CT.

The sequences of searches for a given tick cycle would be ended by either:

(i) conducting the last required search for a tick cycle on the calendars containing the least frequent changing CT value or
(ii) reaching the last system clock cycle of the tick cycle. In this case, those searches that were not completed would be postponed until a later tick cycle.
(c) conduct one (or more) of the postponed searches if all the required searches in
(a) are completed before the end of the tick cycle is reached.

There is a circuit that determines when CT for each time based calendar has just changed, and remains active for the tick cycle following the change. This is used to determine if every time-based search can be conducted on the tick cycle using the new value of CT. If not, there is a circuit that remembers the calendar number(s) that the search could not be conducted for, and postpones these searches until such time that there is an opportunity to do so. The structure is organized such that the calendars that change least frequently would be the ones most likely to be postponed, as these are the calendars that have more time between required searches due to changes in CT. It is calendars that have more time between required searches due to changes in CT. It is required that all postponed searches be performed prior to the next periodic change to CT. It should also be noted that the sooner (earliest tick cycle) that the postponed searches are conducted relative to the tick cycle that CT changes, more precision will be kept in the "ideal" operation of the device.

BRIEF DESCRIPTION OF THE DRAWINGS

The present invention together with the above and other advantages may best be understood from the following detailed description of the illustrated embodiment of the invention illustrate in the drawings; wherein:

FIG. 6G shows a flowchart of the Postponed Calendar Sequence.

FIG. 9 shows Table I of the initialization routine which is done by the FSM.

FIG. 10 shows Table II illustrating Array accesses during a "tick" cycle.

FIG. 11 shows Table III illustrating Type I search.

FIG. 12 shows Table IV illustrating Type II search.

FIG. 13 shows Table V illustrating Type III search.

FIG. 14 shows Table VI illustrating Type IV search.

FIG. 15 shows Table VII illustrating Type V search.

DETAILED DESCRIPTION OF THE ILLUSTRATED EMBODIMENT

The invention described hereinafter may be used in any environment, particularly in computers, where a structure with a specific number of calendars is to be searched. It works well in communications devices such as an interface device, also called Network Processor, and as such is described in that environment. However, this should not be construed as a limitation on the scope of the invention since it is well within the skill of one skilled in the art to make changes or modification to adapt the invention to several other technologies. Any such changes or modification is intended to be covered by the claims set forth herein.

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
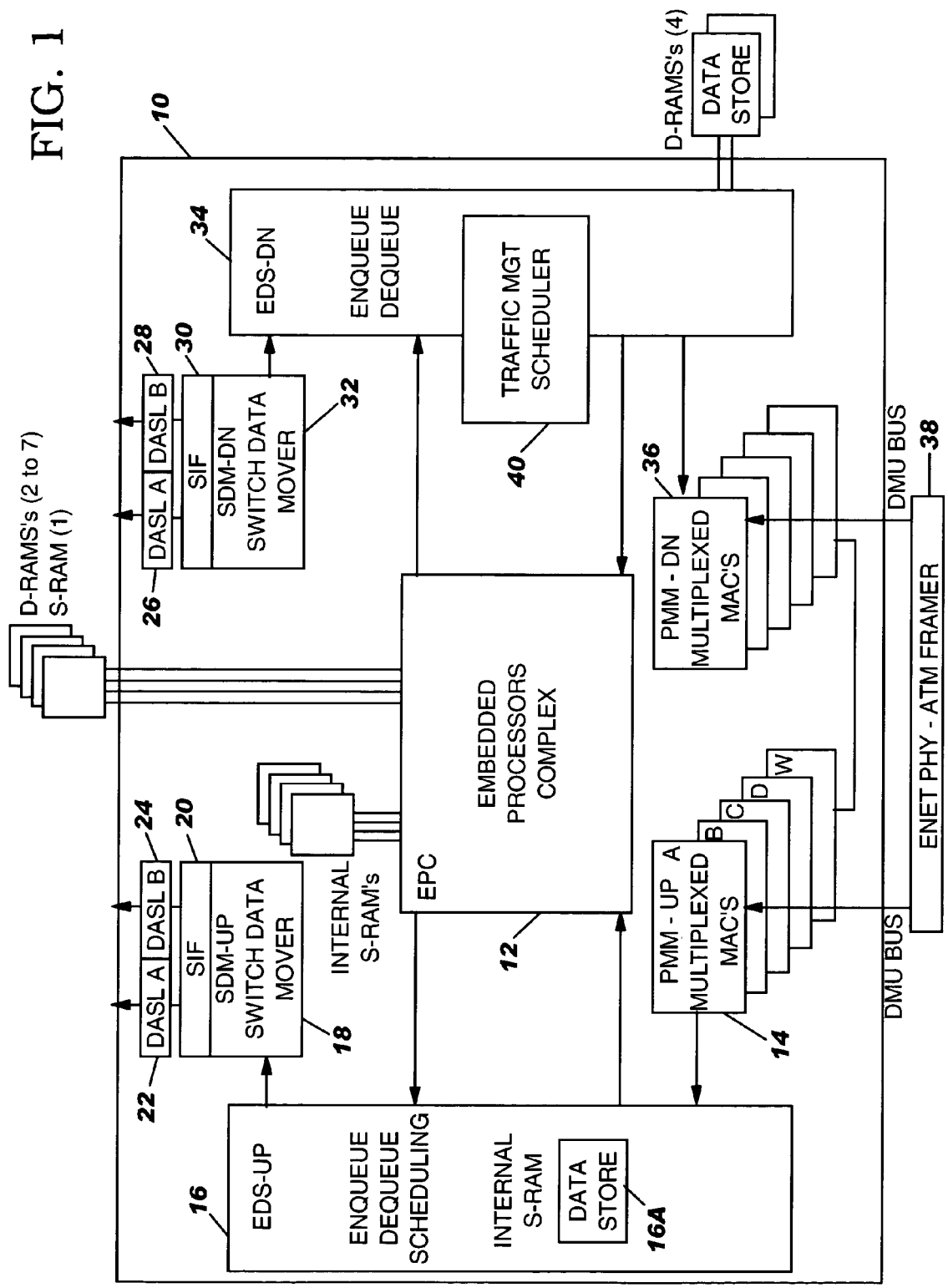
FIG. 1 is a block diagram of an interface device or Network Processor including teachings of the present invention.

FIG. 1 shows a block diagram of the interface device chip that includes the substrate 10 and a plurality of subassemblies integrated on the substrate. The sub-assemblies are arranged into an upside configuration and a downside configuration, with the "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). The invention described hereinafter is in the egress portion of the chip.

Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, System Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data links DASL-A 26 and DASL-B 28, system interface SIF 30, switch data mover SDM-DN 32, enqueue-dequeue-scheduler EDS-DN 34 and multiple multiplexed MAC's for the egress PMM-DN 36. The substrate 10 also includes a plurality of internal static random access memory components (S-RAM's), a traffic management scheduler 40 (TRAFFIC MGT SCHEDULER) also known as the Egress Scheduler containing the teachings of the present invention and an embedded processor complex 12 described in greater depth in the NPU Patent referenced above. An interface device 38 is coupled by the respective DMU busses to PMM 14, 36. The interface device 38 could be any suitable hardware apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached. A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the subsequent processing in the plurality of processors in the EPC. After the input units or frames are processed by one of the plurality of processors in the embedded processor complex, the completed information units are scheduled through the scheduler 40 out of the processing unit 10 and onto the data transmission network through the PMM-DN multiplexed MAC's 36 and the physical layer 38. It is the scheduling of data by the scheduler 40 and in particular timing system within the scheduler that the present invention will describe hereinafter.

Figure 2:
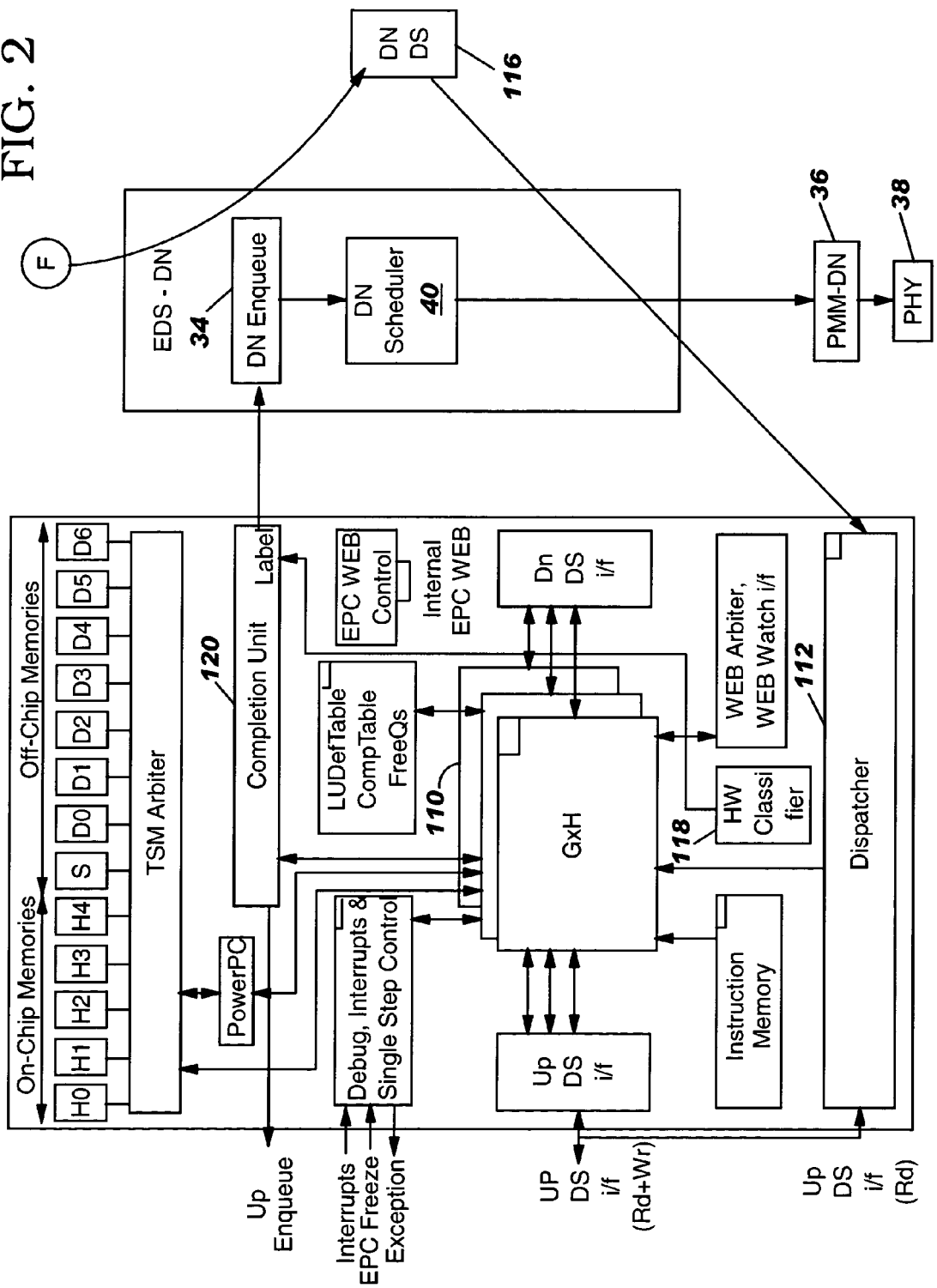
FIG. 2 shows a block diagram of the Embedded Processor Complex (EPC), DN Enqueue and DN Scheduler.

FIG. 2 is a block diagram of a processing system which can employ the present invention to advantage. In this FIG. 2, a plurality of processing units 110 are located between a dispatcher unit 112 and a completion unit 120. Each incoming frame F (from a switch, not shown, attached to the present data processing system) is received and stored into a DOWN data store (or DN DS) 116, then sequentially removed by the dispatcher 112 and assigned to one of the plurality of processing units 110, based on a determination by the dispatcher 112 that the processing unit is available to process the frame. Greater detail on the structure and function of the processing units 110 in particular, and the processing system in general, can be found in the NPU Patent references above and patent applications and descriptions of the individual components such as a flow control device detailed in the Flow Control Patent. Interposed between the dispatcher 112 and the plurality of processing units 110 is a hardware classifier assist 118 which is described in more detail in a pending patent application Ser. No. 09/479,027 filed Jan. 7, 2000 by J. L. Calvignac et al. and assigned to the assignee of the present invention, an application which is incorporated herein by reference. The frames which are processed by the plurality of network processors 110 go into a completion unit 120 which is coupled to the DN Enqueue 34 through a flow control system as described in the Flow Control Patent and the Packet Discard Patent. The DN Enqueue 34 is coupled to the Dn Scheduler which is coupled through the PMM DN MAC's 36, then by the DMU data bus to the physical layer 38 (the data transmission network itself).

Figure 3:
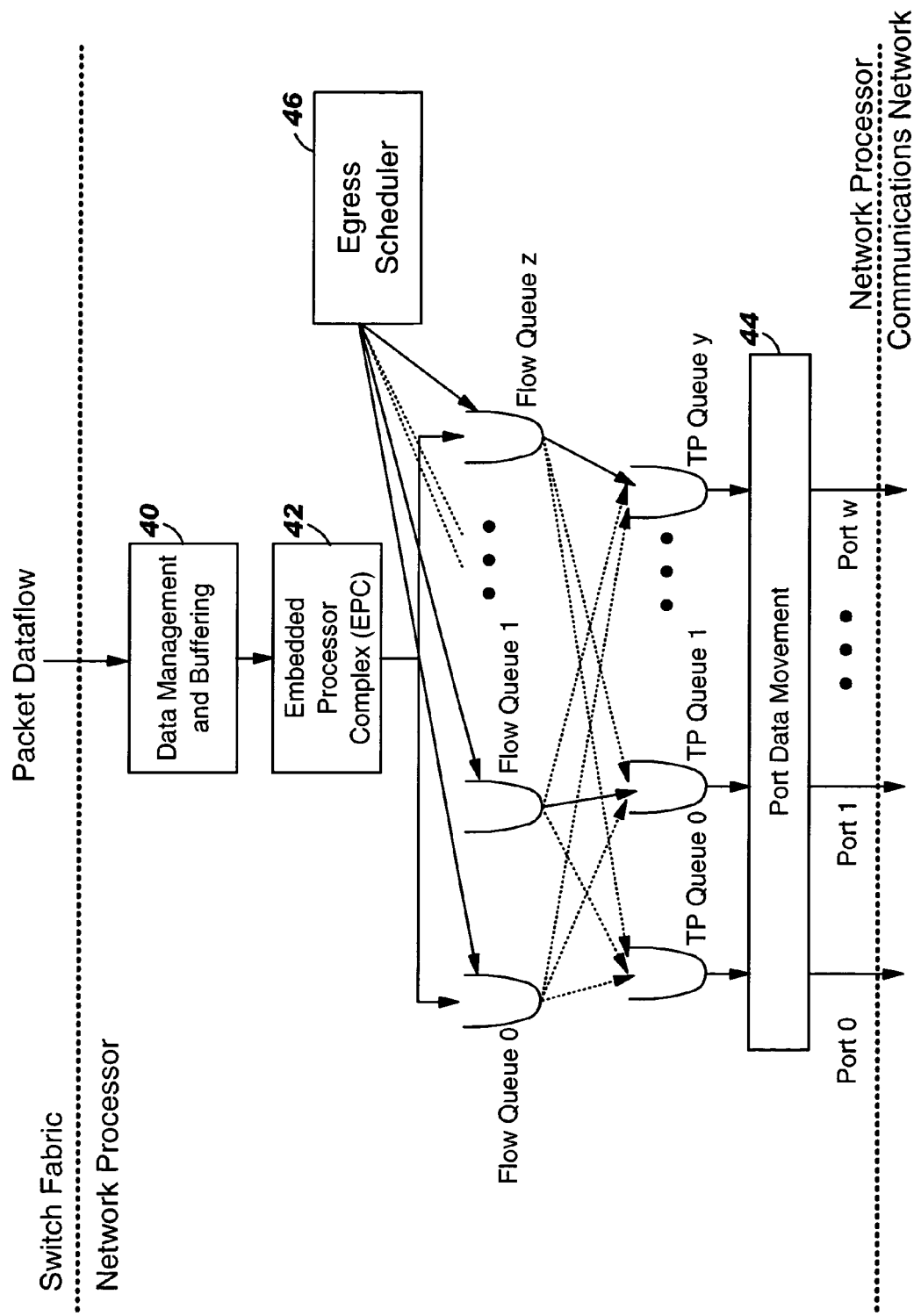
FIG. 3 shows a block diagram with more details of the Network Processor and scheduler including teachings of the present invention.

FIG. 3 shows a block diagram of the data flow on the Egress side of the Network Processor. It should be noted that Network Processor (NP) and Interface Device are used interchangeably. To make the figure less complicated only components which are necessary to understand the invention are shown. The components include Data Management and Buffering 40, Embedded Processor Complex 42, Flow Queues 0-Z, target port (TP) queues 0-Y, Port Data Movement 44 and Egress Scheduler 46. Each egress packet enters the Network Processor from a switched fabric against a "connection", that is, a definition of a path from the switched fabric to a specific output port. Prior to sending of any packet data this path is defined. Included in this path is the addressing information that is a part of the packet "header". This header is part of a table definition in the EPC that allows the EPC to determine the destination flow queue to which the data is enqueued. Each flow queue has a Queue Control Block (QCB) contained in the scheduler function that defines the destination target port (TP) in that flow queue.

Still referring to FIG. 3, egress packets enter the Network Processor and are buffered (stored) by Data Management and Buffering 40 which is responsible for managing the pointer to the packet data. These pointers will be passed to each functional block that will process the packet ending with the step where the packet data exits the Network Processor through the output ports. The Egress Scheduler 46 monitors the flow queues, and as packets are placed in a selected queue, the Egress Scheduler initiates movements of those packets in accordance with the invention to be described hereinafter and other Quality of Service (QoS) requirements to the appropriate target port from which the port data movement 44 packages the data in accordance with predetermined transmission protocol such as ethernet, etc., and forwards the data through one of the ports 0 through port w.

Figure 4:
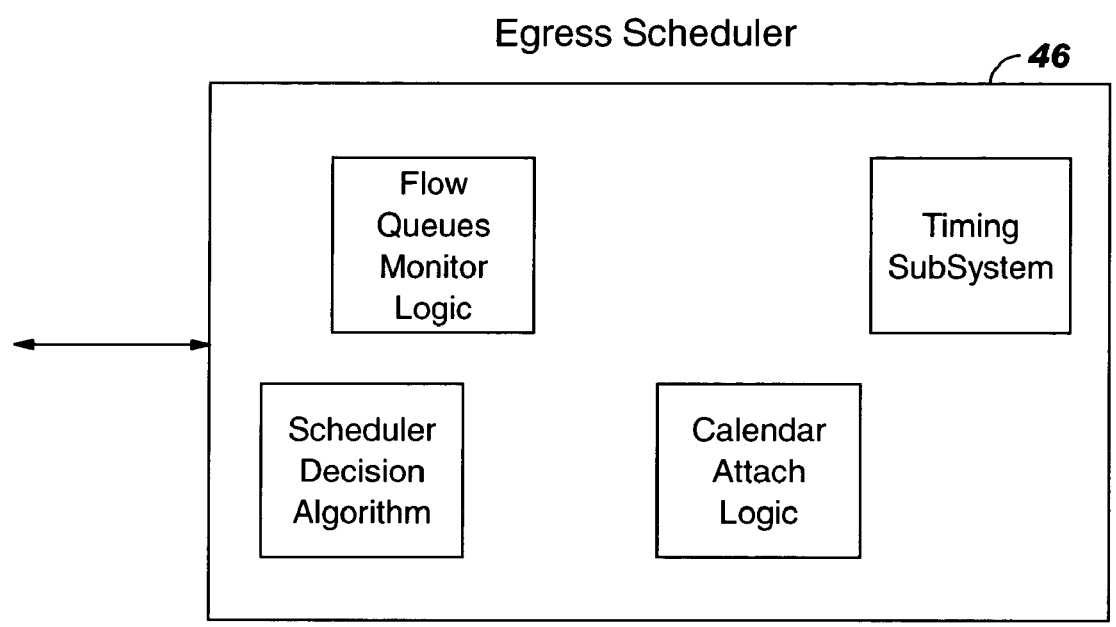
FIG. 4 shows a logical representation of the scheduler including the timing subsystem according to the teachings of the present invention.

FIG. 4 shows a logical block diagram of Egress Scheduler 46. The function of Egress Scheduler 46 is to monitor the flow queues and at appropriate times determined by the invention herein move packets from flow queue to the target port (TP) Queue. To this end the Egress Scheduler 46 includes a plurality of functions which cooperate to provide the overall function of the scheduler. Included in the functions are the flow queue monitor logic which, among other things, monitors flow queue to determine when a data packet is placed in a flow queue by the Embedded Processor Complex. The Egress Scheduler 46 also includes the timing subsystem (to be described hereinafter) according to teachings of the present invention, calendar attach logic etc.

It should be noted that even though the functions which are necessary for the Egress Scheduler 46 to carry out its function are shown in FIG. 4 as internal to the scheduler this is only a logical representation. In an actual Network Processor some of these functions may be located elsewhere in the Network Processor and not necessarily within the scheduler itself.

Still referring to FIGS. 3 and 4, the data packets enter the traffic flow queue 0-Z at a given queue id. Each of the queue ids has a level of service requirement, as specified via the QoS parameters. When a packet enters a queue, Timing Subsystem (described below) of the Scheduler 46 determines when this packet may exit the same traffic queue id. This determination is performed by attaching the queue id to one of the locations of a calendar in the timing system (details set forth herein) per the queue service requirements and using the network scheduler decision algorithm. There may be more than one packet in the traffic queue at any one time in that another packet may enter the same queue id before the scheduler determines that a packet may exit the queue. When there is one or more data packets in a traffic flow queue a queue will be attached to one of the many network scheduler calendars which indicates that the queue will be serviced at a later time. When a packet exits the queue, the scheduler will remove the queue id from the calendar location from which it was attached. If a packet exits the traffic queue and there is at least one additional packet in the queue, the scheduler will reattach this queue ID to another calendar location for service (packet exits from the queue) at a later time. If there are no more packets in the queue after a packet exits, the scheduler will not reattach this queue ID to a calendar location. The scheduler continues to select traffic queues for service, one by one, until there are no more remaining packets in the traffic flow queues. During normal scheduler operation only one packet may enter a traffic flow queue during a tick cycle. A tick cycle is defined as a fixed number of system clock cycles in duration, and only one packet may enter and exit any of the traffic queues during a tick cycle. Whenever one or more packets are in a traffic queue, this queue ID will be attached to one of the network scheduler calendars by the scheduler. This attachment indicates that a packet is due at some time in the future to exit the traffic queue. Only one packet may enter/exit one traffic queue at a time so there cannot be simultaneous packet entries into two or more queues nor can there be simultaneous packet exits from two or more queues.

In particular, FIG. 3 shows a diagram of the Network Scheduler operating as follows:

Data packets enter the traffic queue at a given queue ID. Each of the queue ID's have a level of service requirement. When a packet enters a queue, the network scheduler determines when this packet may exit the same traffic queue. There may be more than one packet in the traffic queue at any given time, in that another packet may enter the same queue before the first packet has exited the queue. The determination of when a packet may exit a flow queue is performed by (1) attaching the queue ID to one of the Calendars at a specific calendar location, as specified by the Scheduler algorithm; and (2) considering this queue ID, along with other queue ID's that have been attached to the same or other calendar location for service via a calendar search. The search will determine which calendar location is the proper location that should be serviced next, if at all, and this calendar location is determined to be the "winning calendar location". The flow queue ID that has been attached to the winning calendar location will be serviced via moving a packet from this flow queue. At this time, the scheduler will detach this queue ID from the location where it was attached. If there is an additional packet in the queue after the packet has exited, the scheduler will re-attach this queue ID to another calendar location per the algorithm. If there are no more packets in the queue after the first packet has exited, the scheduler will not re-attach this queue ID to a calendar. The scheduler continues to select traffic queues for service in this fashion, one-by-one, until there are no more remaining packets in any of the traffic queues.

Figure 5:
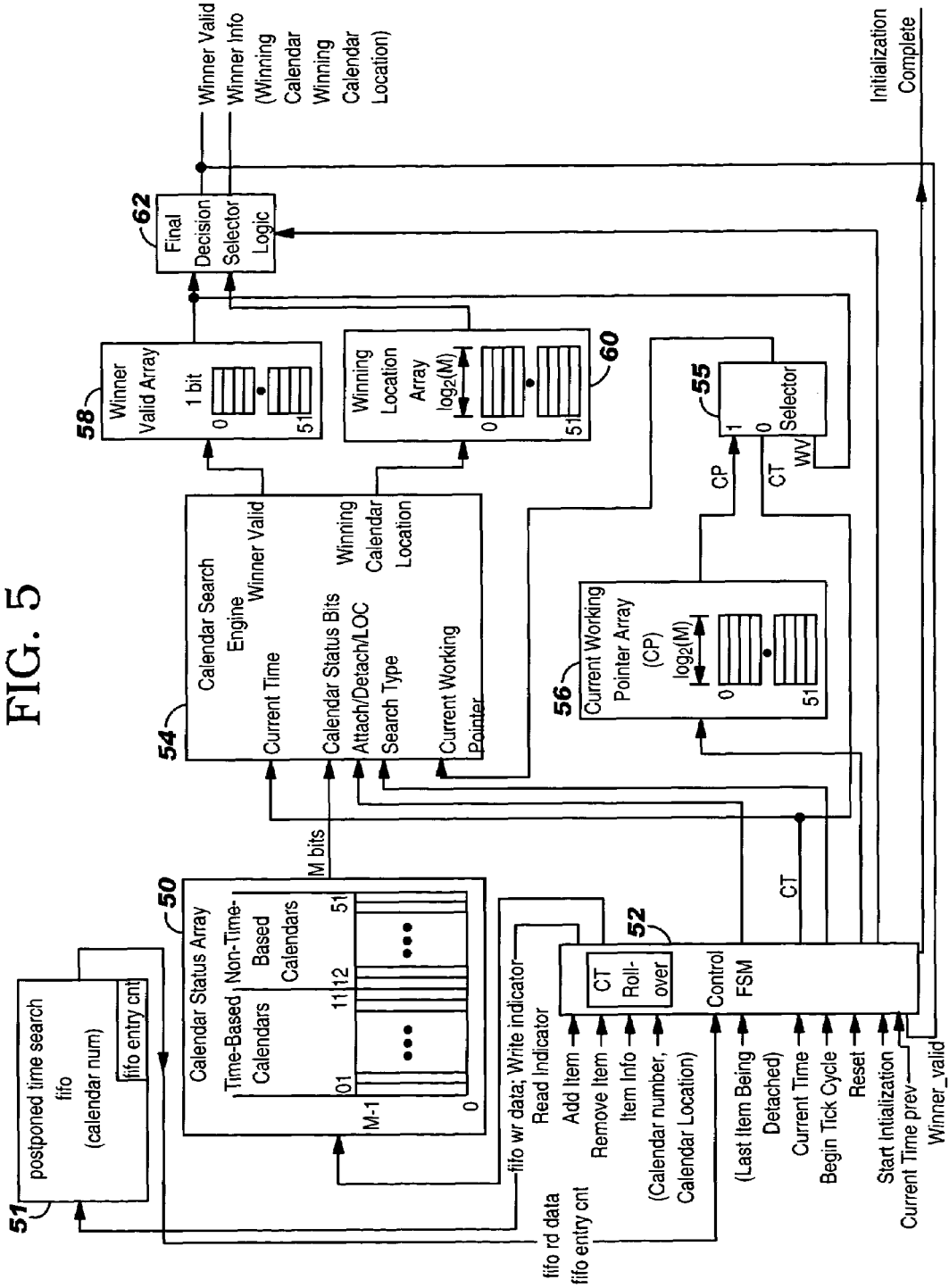
FIG. 5 shows a block diagram of the timing system according to teachings of the present invention.

FIG. 5 shows a block diagram of the timing subsystem according to the teachings of the present invention. The timing subsystem includes Calendar Status Array 50, Control Postponed Time Search FIFO 51, Finite State Machine (FSM) 52, Calendar Search Engine 54, Current Working Pointer Array (CP) 56, Selector 55, Winning Location Array 60, Winner Valid Array 58 and Final Decision Selector logic 62. The named structures are operable interconnected as shown in the figure.

Calendar Status Array 50 includes Q calendars. In the disclosed embodiment Q=52. However, this value of Q should not be a limitation on the scope of the invention since the number of calendars chosen is a design choice and does not intend to limit the teachings of the present invention. The Q calendars includes 12 time based calendars and 40 non-time based calendars. In FIG. 5 the time based calendars are numbered 0 through 11 while the non-time based calendars are labeled 12 through 51. The arrays are identical in the sense that each one includes a memory of M continuous storage locations. In the preferred embodiment of this invention M=512. Each location includes a 2-state status bit and space for storing an identifier which corresponds to the ID number of a flow queue within the system. When a packet is placed into a flow queue the scheduler attaches the flow queue number to a location on one of the calendars and activates (turns on) the corresponding status bit. The described invention does the calendar searches described below, determines whether or not a winner is valid, and selects the Winning Calendar and Winning Location and returns this information to the Scheduler which detaches the queue ID from the location and deactivates (turn off) the status bit, if necessary. The information is used to move a frame from a flow queue to a port queue or other location within the device.

The Postponed Search FIFO is the structure (memory) that contains the Time-based calender numbers that have been postponed. The number of entries in this FIFO should be sufficient to hold the maximum number of postponed searches in the worst case time interval. This FIFO is written to by the Control FSM at the time that a search is postponed, and an entry is removed when there is an opportunity to perform postponed searches. This FIFO also has a counter containing the number of entries in the FIFO, which is an output to the Control FSM to indicate when the FIFO is empty.

The Control Finite State Machine (FSM) is the structure that controls the other structures within the timing subassembly of the present invention. The Control FSM performs initialization function and starts the different sequences that are required in order to search the calendar. A flowchart showing the logic used in the Control FSM will be given subsequently. In one embodiment of the present invention the FSM can initiate five types of searches or sequences. Once the search type is initiated the manipulation of structures within the system is carried out by tables which are discussed hereinafter. The five types of searches are:

1. Neither an attached nor a detached time based search (Search Type I)
2. Attached to a time based calendar (Search Type II)
3. Attached to a non-time based calendar (Search Type III)
4. Detached from a time based calendar (Search Type IV)
5. Detached from a non-time based calendar (Search Type V)

The Control FSM 52 includes a plurality of input control lines. The input control lines include Add_Item which indicates that an item is to be attached to a particular calendar location; Remove_Item indicating an item is to be detached from a particular calendar location; Item Information which includes calendar number and calendar location; Last Item Being Detached (LIBD) indicating that the item is the last one from this calendar location to be detached; Current Time indicating current time; Begin Tick_Cycle indicating the beginning of a tick period; Reset indicating the system should be reset; Start_Initialization indicating the Control FSM should start initializing the system, Current Time prev, which is the value of current time on the previous tick cycle, indicating and Winner_Valid feedback indicating a winner has been found and is valid. Depending on the input of the named signals, the Control FSM will generate signals to control the structure to which its output lines are connected.

The Control FSM also contains the structure that determines if a current time value for the time-based calendars just changed on the current tick. That is, if the value of a CT value on this tick cycle is different than that of the previous tick cycle, this indicator will remain active for the entire tick cycle. This structure is called "ct_rollover", and there is an indicator for each of the time-based calendars (four, in this case). This structure is used to indicate that a calendar search is necessary strictly due to the value of CT changing. The generation of CT is described later in this invention. In addition, the Control FSM contains logic to control the Postponed Search FIFO and update the counter holding the number of entries in the FIFO. The logic to add and remove entries (the entries are the calendar number of the calendars to be searched) are also contained in the Control FSM.

The Calendar Search Engine 54 performs the searches to be conducted and generates Winner Valid and Winning Calendar Location on the ports labeled as Winner Valid and Winning Calendar Location. The input into Calendar Search Engine 54 includes a current time port to which current time is applied; Calendar Status Bits port to which M bits from the Calendar Status Array are applied; Attach/Detach/Location port to which attach signal detach is applied; the Search Type port indicating the type of search to be conducted and Current Working Pointer port indicating the position from which the search should begin.

The Current Working Pointer (CP) array 56 is a memory having P consecutive locations with P equal to the number of calendars in the Calendar Status Array. In the disclosed embodiment P equals 52 labeled 0 through 51. The width of each location in the CP array is $\log_2(M)$, wherein $\log_2(M)$ equals the bit width of a value that will point to each bit of an entry in the calendar status array. In the disclosed embodiment each calendar has 512 locations. Therefore, M equals 9 ($2^9$=512). The Current Working Pointer Array structure 56 holds the CP identity of the 52 calendars and the location whereat the CP is positioned within a particular calendar. The addressing structure is identical to that of the Calendar Status Array 50, in that locations 0-11 are for the time based calendars and locations 12-51 are for the 40 non-time based calendars. As will be described hereinafter during initialization, the Control FSM 52 writes the value of Current Time into the CP array for each of the time based calendars and an arbitrary choice of zero for each of the non-time based calendars. When it is time to perform a calendar search using the Calendar Search Engine 54 a read of the CP array structure is performed, and the array corresponding to the target calendar is presented to the CP calendar search engine via the Current Working Pointer port already described. The Selector 55 receives a signal from the Winner Valid Array and depending on the value of a bit position in the Winner Valid (WV) Array selects either the CP or CT. In particular, if the bit is a zero the Selector selects the CT input signal to apply to the Current Working Pointer port and if a logical 1 selects the CP signal line to apply to the Current Working Pointer port. The Winner Valid Array structure 58 includes a memory 1 bit wide and 52 locations deep. Each location indicates, via a logical bit, whether or not a Winner has been found by the search engine for each of the calendars. There is one bit for each of the calendars. During initialization, the control FSM writes a value of logical zeroes to all the locations. The bits for each are updated with the results of each of the searches.

The Winning Location Array 60 is of the same structure as the previously described Current Working Pointer Array. It is a memory containing 52 locations labeled 0-51 and each location being of width $\log_2(M)$, used to identify a location within a calendar. This structure does not have to be initialized as it is qualified by the corresponding Winner Valid Array bit. If a winner is found by the Calendar Search Engine the Control FSM stores a Winning Calendar Location in the Winning Calendar Location Array concurrently with the Winner_Valid bit in the location corresponding to the appropriate calendar.

The Final Decision Selector Logic 62 includes combinatorial logic (details given later) which determine the true "Winner". This is performed as per the Scheduler algorithm which is a priority search. The Control FSM accesses each location of the Winner Valid Array, beginning with location 0 and incremented through each location in the array. The first location that contains a non-zero bit will be the true winner, and the corresponding entry in the Winning Calendar Location Array will appear at the output along with a Valid Winner, Valid Signal and the Winning Calendar Address.

Figure 6A:
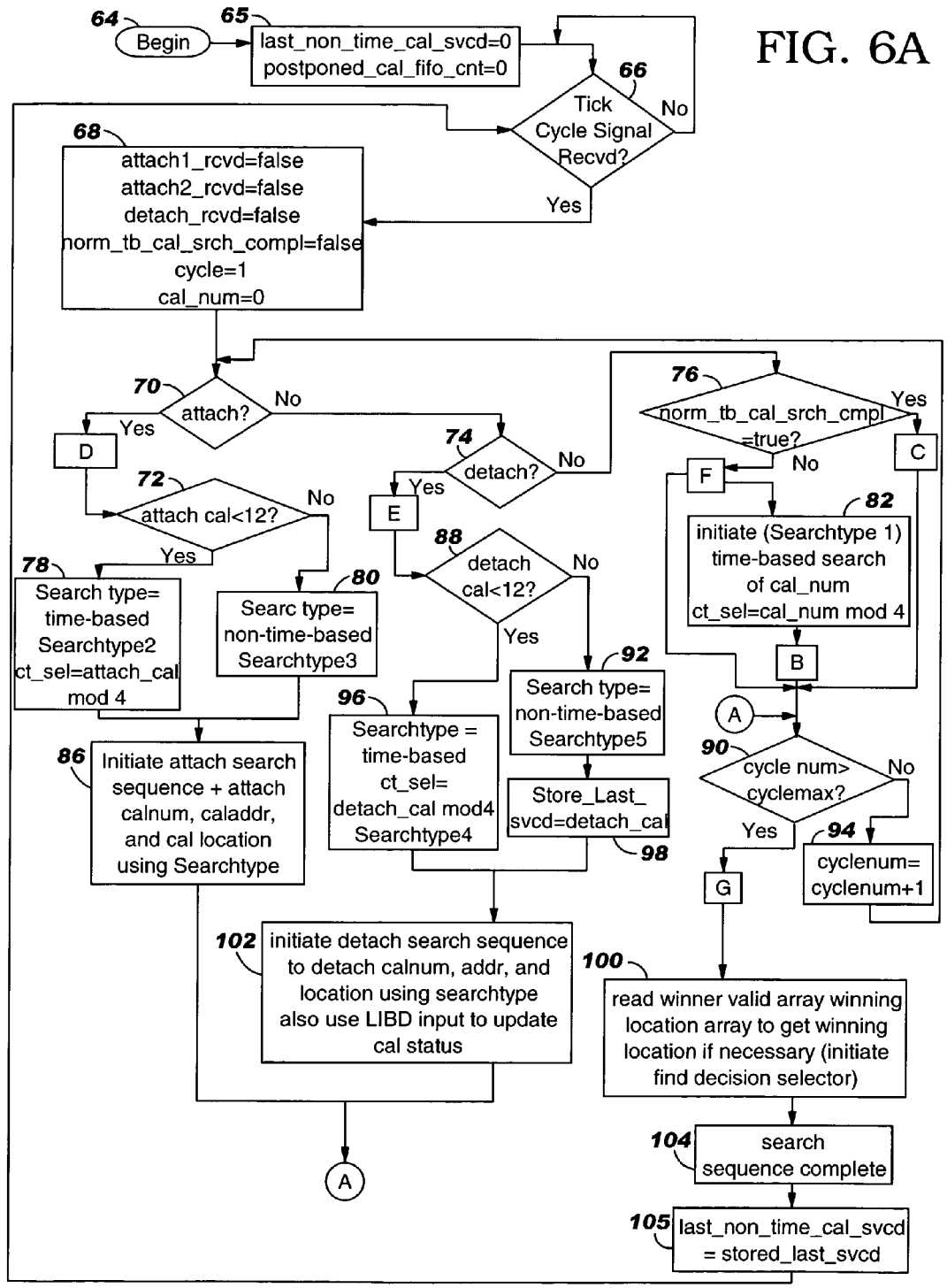
FIG. 6A shows a flowchart of the Control Finite State Machine (FSM).

FIG. 6A shows a flowchart of the logic for the Control FSM 52.

The flowchart of FIG. 6A begins in block 64. Block 65, which initializes last_non_time_cal_serviced to a value of zero (arbitrarily chosen), and initializes the postponed_cal_fifo_count to a value of zero, is entered. Last_non_time_cal_serviced is an input to the final decision selector. Postponed_cal_fifo_count resides in the postponed time search FIFO. Next, decision block 66, which asks if a begin_tick_cycle signal is active, is entered. If the answer to block 66 is no, decision block 66 is re-entered. If the answer to block 66 is yes, then block 68, which does the following two things, is entered: (i) initializes two counters, "cycle" and "cal_num" both to values of zero and (ii) initializes the following four variables, attach1_rcvd, attach2_rcvd, detach_rcvd, and norm_tb_sel_srch_cmpl, each to a value of false. Block 68 is entered at the beginning of every tick cycle. The "cycle" counter is a count which increments once each system clock cycle, and determines when the final decision logic is to be activated. The "cal_num" variable points to a specific calendar. The time-based calendars have a cal_num range of zero to eleven. During a tick cycle, two calendar attaches and one calendar detach, at the most, may be received. The attach1_rcvd, attach2_rcvd, and detach_rcvd variables are used to indicate whether these events (one or two attaches) have occured during a calendar tick cycle. There is a corresponding calendar number variable for each of the attach received variables to indicate which calendar the action was taken against. The norm_tb_ cal_srch_cmpl variable indicates that all the time-based calendars have been searched on the current tick cycle. This variable is set when all allowable searches for the tick cycle have been completed, and is generated at the end of each tick cycle.

After exiting block 68, decision block 70, which asks if the attach input signal is active on this clock cycle, is entered. If the answer to block 70 is no, then decision block 74, which asks if the detach input signal is active on this clock cycle, is entered. If the answer to block 70 is yes, then function block D, whose flowchart is detailed in FIG. 6D, and will be described in detail later, is entered. Function Block D sets the appropriate attach variables for later use. After leaving function Block D, decision block 72, which asks if the attach calendar is less than 12, is entered. If the answer to block 72 is yes, then block 78, which indicates that (1) the search type is time-based, (2) the search type is of Type 2, and (3) the value of the ct_sel (used to determine the value of ct that is sent to the calendar search engine) is equal to a value of attach_cal modulo 4. Block 86, which says to initiate the attach search sequence to the attach cal number, cal_address, and cal_location, is then entered. If the answer to block 72 is no, then block 80, which indicates that (1) the search type is non-time-based, and (2) the search type is of Type 3. Block 86, which was described above, is then entered.

If the answer to decision block 74 (described above) is yes, then function block E, whose flowchart is detailed in FIG. 6E, and will be described in detail later, is entered. Function Block E sets the appropriate detach variable for later use. After leaving Function Block E, then decision block 88, which asks if the detach calendar is less than 12 (time-based) is entered. If the answer to decision block 88 is yes, then decision block 96, which indicates that (1) the search type is time based, (2) the value of ct_sel is equal to a value of detach_cal modulo 4, and (3) the search type is a Type 4 search. Block 102, which says to (1)initiate the detach search sequence to the detach cal_num, cal_address, and cal_location using the search, and (2) used the LIBD (last item being detached) input to update the proper calendar status bit in the calendar status array, is then entered.

If the answer to decision block 88, which was described above, is no, then block 92, which indicates that (1) the search type is a non-time-based search, and (2) the search type is of Type 5, is then entered. Next, block 98, which indicates that a stored value called "stored_last_serviced" takes on the value of the detach_cal input. This stored value will be used when the final decision selector is activated. Block 102, which was described earlier, is then entered. When exiting block 102, block 90, which will be described later, is then entered.

If the answer to decision block 74, which was described earlier, is no, then block 76 is entered, which asks if the norm_tb_cal_srch_cmpl value is true. Stated another way, it asks if all of the required time-based searches due only to CT input changing is true, is then entered. If the answer to block 76 is no, then Function Block F, whose flowchart is detailed in FIG. 6F, and will be described in detail later, is entered. Function Block F determines if a calendar search for the time based calendar being currently pointed to is necessary based on the value of CT changing from the previous tick cycle to the current tick cycle. Block F will move through the time-based calendars, going from more frequently changing CT to less frequently changing CT until a calendar is reached that requires a search. If it is determined that a calendar search is required, then Function Block F will exit into Block 82, which will be described later. If it is determined that a calendar search is not required on any of the remaining calendars, then Function Block F will exit into decision block 90, which will be described later.

After entering Block 82, which says to initiate a time-based search (Search Type 1) of the calendar indicated by cal_num, is then entered. Next Function Block B, whose flowchart is detailed in FIG. 6B, and will be described in detail later, is entered. Function Block B changes the value of cycle_num to the value corresponding to the next time-based calendar to be searched. Decision block 90, which asks if the cycle num is greater than the value of cycle_max (used to determine if the final decision selector function is to be activated) is then entered. Cycle_max is a variable that is a function of how many system clock cycles are in a tick cycle. This value will not change during operation. For this implementation, this value would be two less than the number of system clock cycles per tick cycle. This is because of the finite time it takes to access storage devices. If the answer to block 76 is yes, then Function Block C, whose flowchart is detailed in FIG. 6C, and will be described in detail later, is entered. Function Block C, which drives the control of initiating postponed searches, is then entered. After exiting Function Block C, then decision block 90, which was described earlier, is entered.

If the answer to decision block 90 is no, then block 94, which increments the value of cycle_num by a value of one, is then entered. Next, decision block 70, which was described earlier, is then entered. If the answer to decision block 90 is yes, then Function Block G, whose flowchart is detailed in FIG. 6G, and will be described in detail later, is entered. Function Block G stores the calendar numbers whose searches are to be postponed by writing to the Postponed Search FIFO, is then entered. After leaving Function Block G, block 100, which (1) initiates the final decision selector, and, (2) initiates a read of the wining location array if a winner is found, is then entered. Block 104, which indicates that the search sequence is complete, and the winner_valid and Winner_info outputs are updated to reflect the final outcome of the search. Block 105, which says to give the value of last_non_time_cal_svcd the value of stored_last_serviced, is then entered. Then decision block 66, which waits for the next begin_tick_cycle signal, is entered. FIG. 6A is of a cyclical nature, so there is no ending point.

Figure 6B:
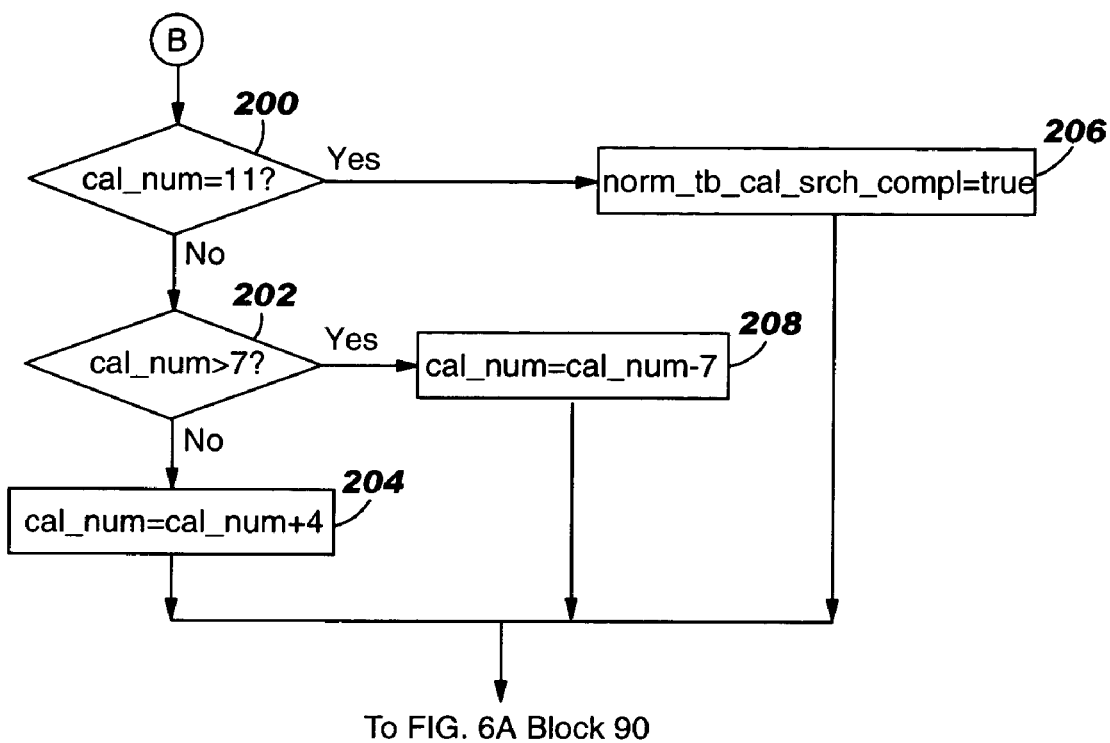
FIG. 6B shows a flowchart of the details of indexing the cal_number variable to the next entry when performing time-based calendar searches (on FIG. 6A).

Prior to entering FIG. 6B, block 82 of FIG. 6A was exited. FIG. 6B begins by entering decision Block 200, which asks if the value of the cal_num variable is greater than 11. If the answer to block 200 is yes, then block 206, which set the value of norm_tb_cal_srch_cmpl to true, is entered. After leaving block 206, FIG. 6B is exited by returning to block 90 of FIG. 6A. If the answer to block 200 is no, then decision block 202, which asks if the value of cal_num is greater than 7, is then entered. Decision block 202 is the mechanism to decide if the next set of time granularity calendars is to be accessed. If the answer to block 202 is yes, then block 208, which decrements the value of cal_num by a value of 7, is entered. Block 208 moves the cal_num pointer to the next set of time-based calendars. After leaving block 208, FIG. 6B is exited by returning to Block 90 of FIG. 6A. If the answer to block 202 is no, then block 204, which increments the value of cal_num by a value of 4, is entered. Block 204 moves the cal_num_pointer to the next calendar of the same group that has the same value of CT. After leaving block 208, FIG. 6B is exited by going to block 90 of FIG. 6A.

Figure 6C:
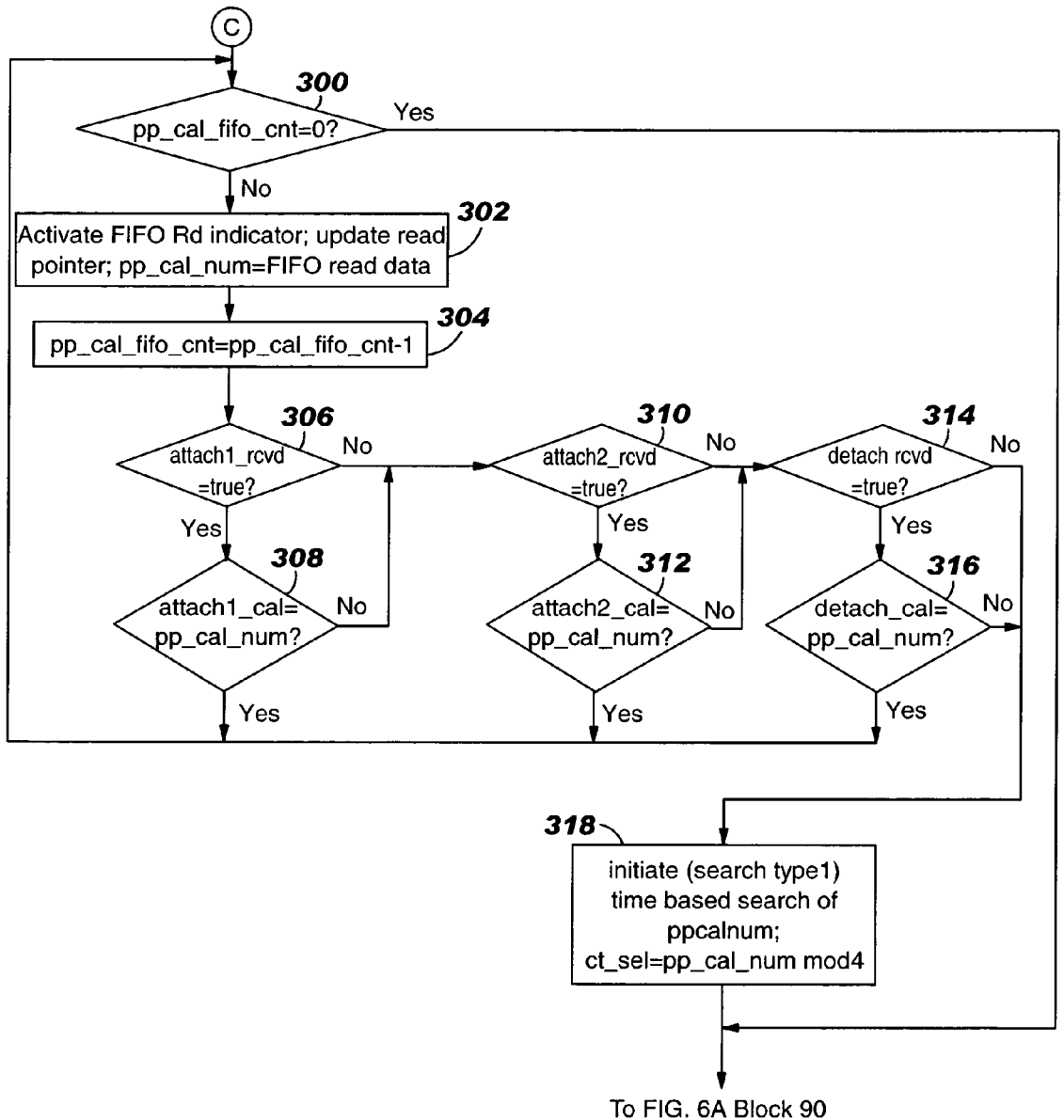
FIG. 6C shows a flowchart of the postponed Calendar search sequence (on FIG. 6A).

Prior to entering FIG. 6C, decision block 76 of FIG. 6A was exited with an answer of yes. FIG. 6C begins by entering decision block 300, which asks if the pp_cal_fifo_cnt value that is in the Postponed Time Search FIFO is equal to zero, is then entered. If the answer to block 300 is yes, then the FIFO is empty, no postponed searches are necessary, and FIG. 6C is exited by returning to Block 90 of FIG. 6A. If the answer to block 300 is no, then block 302, which activates the fifo_rd_indicator signal to the FIFO and activates the signal to update the FIFO read pointer, and sets the value of the pp_cal_num variable to the value that was read from the FIFO, is then entered. Next, block 304, which decrements the value of the pp_cal_fifo_cnt by a value of one, is entered. Decision block 306, which asks if the attach1_rcvd variable is true, is then entered. If the answer to block 306 is yes, then decision block 308, which asks if the value of the attach1_cal variable is equal to the value of pp_cal_num, is entered. Decision block 308 checks to see if the calendar pointed to by pp_cal_num was already searched on the first (previous) attach during this tick cycle. If the answer to block 308 is yes, then block 300, which was described earlier, is entered. If the answer to block 308 is no, then decision block 310, which asks if the attach2_rcvd variable is true, is entered. Also, if the answer to block 306, which was described earlier, is no, then block 310 is entered.

If the answer to block 310 is yes, then decision block 312, which asks if the value of the attach2_cal variable is equal to the value of pp_cal_num, is entered. Decision block 312 checks to see if the calendar pointed to by pp_cal_num was already searched on the second previous attach during this tick cycle. If the answer to block 312 is yes, then block 300, which was described earlier, is entered. If the answer to block 312 is no, then decision block 314, which asks if the detach_rcvd variable is true, is entered. Also, if the answer to block 310, which was described earlier, is no, then block 310 is entered.

If the answer to block 314 is yes, then decision block 316, which asks if the value of the detach_cal variable is equal to the value of pp_cal_num, is entered. Decision block 316 checks to see if the calendar pointed to by pp_cal_num was already searched on the earlier detach during this tick cycle. If the answer to block 316 is yes, then block 300, which was described earlier, is entered. If the answer to block 316 is no, then block 318, which (a) initiates a searchType1 time-based search of the calendar pointed to by the value of pp_cal_num, and (b) sets the value of ct_sel, which is used by the pipeline logic to a value of pp_cal_num mod 4, is entered. Also, if the answer to block 314, which was described below, is no, then block 318 is entered. After leaving block 318, FIG. 6C is exited by going to block 90 on FIG. 6A.

Figure 6D:
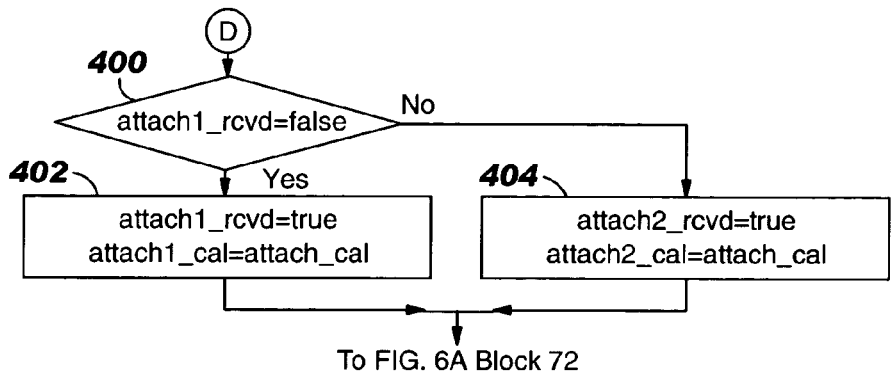
FIG. 6D shows a flowchart of additional Calendar Attach Details (on FIG. 6A).

Prior to entering FIG. 6D, decision block 70 of FIG. 6A was exited with an answer of yes. FIG. 6D begins by entering decision block 400, which asks if the attach1_rcvd variable is false. If the answer to block 400 is yes, then block 402, which sets the value of attach1_rcvd to true, is entered. The attach1_rcvd variable indicates that the first attach for the tick cycle has occurred. Block 402 also sets the value of attach1_cal to the value of attach_cal, which is the number of the calendar being attached to. If the answer to block 400 is no, then block 404, which sets the value of attach2_rcvd to a value of true. The attach2 variable indicates that a second attach for the tick cycle has occurred. Block 404 also sets the value of attach2_cal to the value of attach_cal. Blocks 402 and block 404 both exit at the same point, that point being the exit point of FIG. 6D. The exit point of FIG. 6D goes to decision block 72 on FIG. 6A.

Figure 6E:
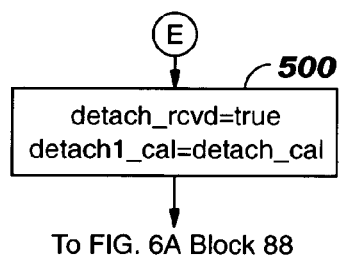
FIG. 6E shows a flowchart of additional Calendar Detach Details (on FIG. 6A).

Prior to entering FIG. 6E, decision block 74 was exited with an answer of yes. FIG. 6E begins by entering block 500, which sets the value of detach_rcvd to true, is entered. The detach_rcvd variable indicates that the only detach for the tick cycle has occurred. Block 500 also sets the value of detach_cal to the value of detach_cal, which is the number of the calendar being detached from. After leaving block 500, FIG. 6E is exited by going to block 88 on FIG. 6A.

Figure 6F:
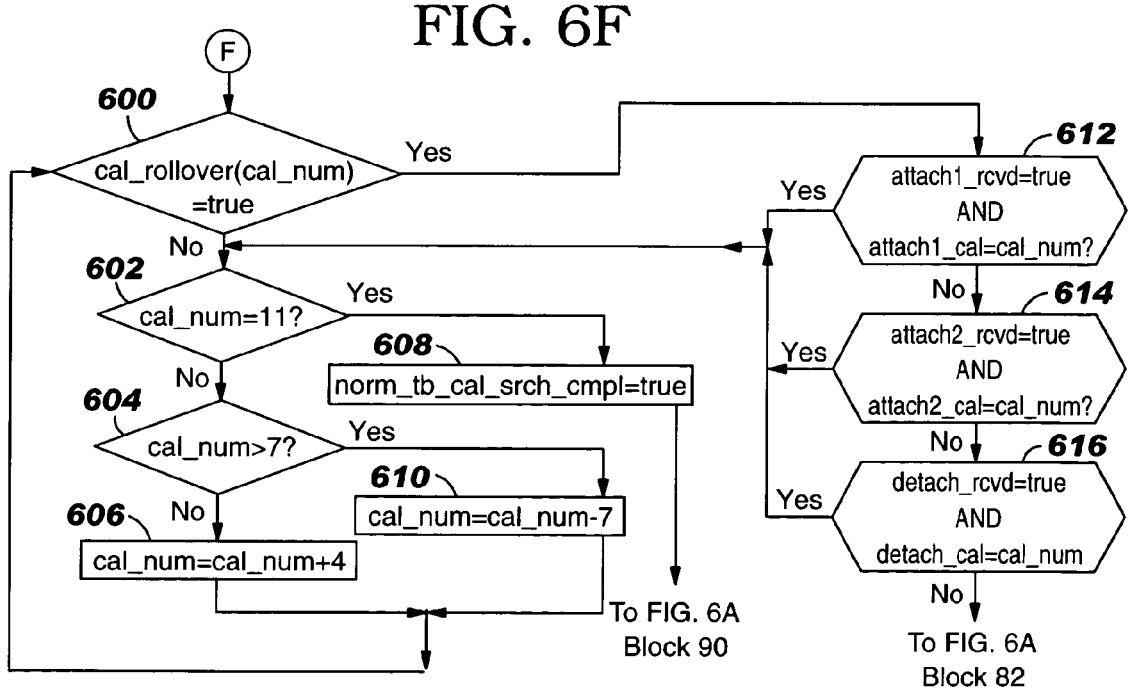
FIG. 6F shows a flowchart of the Details of the adjustment of the cal_number variable when searching for the next scheduled calendar (on FIG. 6).

Prior to entering FIG. 6F, decision block 76 (FIG. 6A) was exited with an answer of no. FIG. 6F begins by entering decision block 600. Decision block 600 asks if the value of the cal_rollover variable is true for the entry corresponding to cal_num. The cal_rollover variable is a bus with one bit for each time-based calendar. The bit indicates if the value of CT for the corresponding calendar has just changed. If the value has changed, then a search for this calendar must be conducted if other conditions are met. If the answer to decision block 600 is yes, then decision block 612, which asks if (a) the attach1_rcvd variable is true, and (b) the value of attach1_cal is equal to the value of cal_num, is entered. If the answer to block 612 is yes, then decision block 602, which asks if the value of cal_num is equal to 11, is entered. If the answer to block 612 is no, then decision block 614, which asks if (a) the attach2_rcvd variable is true, and (b) the value of attach2_cal is equal to the value of cal_num, is entered. If the answer to block 614 is yes, then decision block 602 is entered. If the answer to block 614 is no, then decision block 616, which asks if (a) the detach_rcvd variable is true, and (b) the value of detach_cal is equal to the value of cal_num, is entered. If the answer to block 616 is yes, then decision block 602 is entered. If the answer to block 616 is no, then FIG. 6F is exited (first FIG. 6F exit point) by going to block 82 on FIG. 6A.

If the answer to block 600 is no, then decision block 602, which was described earlier, is then entered. If the answer to block 602 is no, then block 604, which asks if the value of cal_num is greater than 7, is then entered. If the answer to block 604 is yes, then block 610, which decrements the value of cal_num by a value of 7, is then entered. After exiting block 610, decision block 600, which was described earlier, is then entered. If the answer to block 604 is no, then block 606, which increments the value of cal_num by a value of 4, is then entered. After exiting block 606, decision block 600 is entered. If the answer to block 602 is yes, then block 608, which sets the value of norm_tb_cal_srch_compl to true, is then entered. After exiting block 608, FIG. 6F is exited (second FIG. 6F exit point) by going to block 90 on FIG. 6A. To summarize the function of FIG. 6F, this figure searches the time-based calendars until a calendar is reached that has not been previously searched via an attach or detach, and the value of CT for the calendar is different than on the previous tick cycle. All of the activity in FIG. 6F occurs during the same system clock cycle.

Prior to entering FIG. 6G, decision block 90 was exited with an answer of yes. FIG. 6G begins by entering decision block 802. Decision block 802, asks if the value of the norm_tb_cal_srch_cmpl variable is true. If the answer to block 802 is yes, then FIG. 6G is exited by going to block 100 on FIG. 6A.

If the answer to block 802 is no, then block 804, which sets the value of fifo_val to the value of cal_num, is entered. Next, decision block 806, which asks if the value of attach1_rcvd is true, is entered. If the answer to block 806 is true, then decision block 808, which asks if the value of attach1_cal is equal to the value of cal_num, is entered. If the answer to block 808 is yes, then decision block 810, which asks if the value of the attach2_rcvd variable is true, is entered. If the answer to block 806, which was described previously, is no, then block 810 is entered. If the answer to block 808, which was described previously, is no, then block 838, which sets the value of fifo_val to the value of attach1_cal, is entered. After exiting block 838, decision block 820, which asks if the value of cal_num is equal to 11, is entered. If the answer to block 808 is yes, then decision block 810 is entered.

If the answer to block 810 is yes, then decision block 812, which asks if the value of attach2_cal is equal to the value of cal_num, is entered. If the answer to block 812 is yes, then decision block 814, which asks if the value of the detach_rcvd variable is true, is entered. If the answer to block 810, which was described previously, is no, then block 814 is entered. If the answer to block 812, which was described previously, is no, then block 830, which sets the value of fifo_val to the value of attach2_cal, is entered. After exiting block 830, decision block 820, which asks if the value of cal_num is equal to 11, is entered. If the answer to block 812 is yes, then decision block 814 is entered.

If the answer to block 814 is yes, then decision block 816, which asks if the value of detach_cal is equal to the value of cal_num, is entered. If the answer to block 816 is yes, then block 818 is entered. Block 818 performs a write of the variable "fifo_val" to the postponed search FIFO, which updates the write pointers in the FIFO to point to the next location. Block 818 also increments the value of the pp_cal_fifo_cnt by a value of one and activates the FIFO write indicia to the FIFO. If the answer to block 814, which was described previously, is no, then block 818 is entered. If the answer to block 816, which was described previously, is no, then block 834, which sets the value of fifo_val to the value of detach_cal, is entered. After exiting block 834, decision block 820, which asks if the value of cal_num is equal to 11, is entered. If the answer to block 816 is yes then block 818 is entered.

If the answer to decision block 820 is yes, then block 822, which sets the value of norm_tb_cal_srch_cmpl to a value of true. After exiting block 822, decision block 802, which was described earlier, is entered. If the answer to block 820 is no, then decision block 824, which asks if the value of cal_num is greater than 7, is entered. If the answer to block 824 is yes, then block 828, which decrements the value of cal_num by a value of 7, is entered. After exiting block 828, block 802 is entered. If the answer to block 824 is no, then block 826, which increments the value of cal_num by a value of 4, is entered. After exiting block 826, decision block 802 is then entered.

Figure 7:
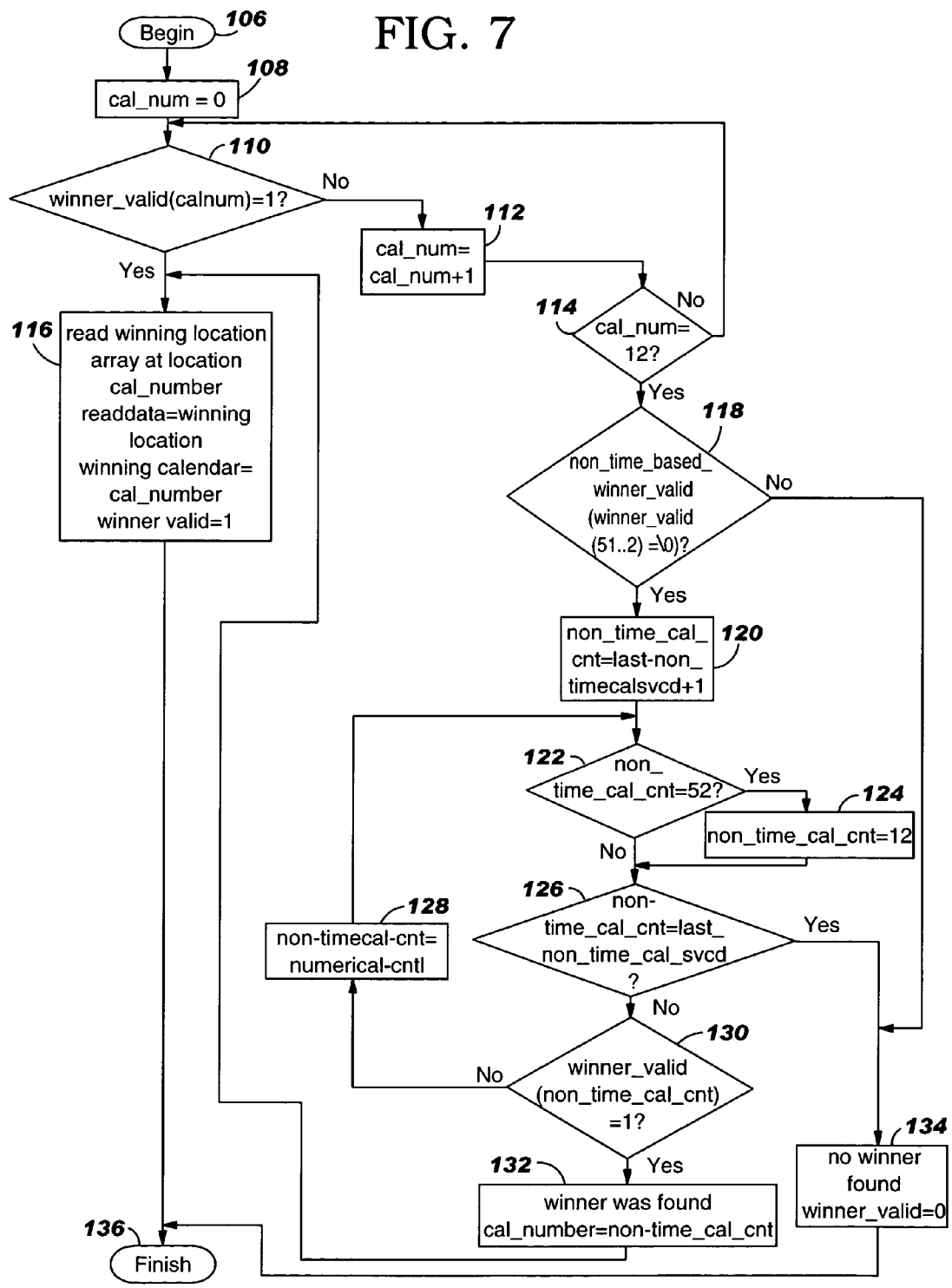
FIG. 7 shows a flowchart of the Final Decision Selector logic.

FIG. 7 shows a flowchart of the logic used in the Final Decision Selector Logic 62. The flowchart begins in block 106 and ends in block 136. After leaving block 106, block 108, which initializes a cal_num counter to a value of zero, is then entered. Decision block 110, which asks if the winner_valid_array_entry for cal_num is equal to a value of logic 1 (valid) is entered. If the answer to decision block 110 is yes, then block 116 is entered. Block 116 indicates that (1) the winner_valid output is true (logic 1), (2) the winning calendar output is the value of cal_num, (3) the value of cal_num is passed to the Control FSM to use as an index to the Winning Location Array, and (4) the data from this read will be the winning location output. Block 136, the ending block, is then entered.

If the answer to decision block 110 is no, then block 112, which increments the value of cal_num by 1, is entered. Decision block 114, which asks if cal_num is equal to 12 (or a non-time-based calendar) is then entered. If the answer to block 114 is no, then decision block 110, described above, is entered. If the answer to block 114 is yes, then Decision block 118, which asks if there is a non-time-based winner, is entered. There is a non-time-based winner if at least one of the winner valid bits for calendars 12 to 51 are valid (logic 1). If the answer to block 118 is yes, then block 120, which sets a counter, called "non_time_cal_cnt" to a value of last_non_time_cal_serviced+1. Last_non_time_cal_serviced comes from the Control FSM. Decision block 122, which asks if the value of non_time_cal_cnt is equal to 52 is entered. If the answer to block 122 is yes, then block 124, which sets the value of non-time_cal_cnt to a value of 12, is entered. Decision block 124 serves the purpose of performing the "circular" portion of the search, and wraps the counter back to the lowest non-time-based calendar index. Decision block 126, which asks if the value of non_time_cal_cnt is equal to the value of last_non_time_cal_serviced, is then entered. If the answer to decision block 122 is no, then decision block 126 is entered. If the answer to block 126 is yes, then block 134, which indicates to the control FSM that no winner was found, is then entered. If the answer to block 118, which was described earlier, is no, then block 134 is entered. After leaving block 134, then block 136, the ending block is entered.

If the answer to decision block 126 is no, then decision block 130, which asks if the winner_valid entry for location non_time_cal_cnt is logic 1, is entered. If the answer to block 130 is yes, then block 132, which indicates that a (1) a winner was found and (2) cal_number is equal to non_time_cal_cnt, is entered. Next, block 116, which was described earlier, is entered. If the answer to decision block 130 is no, then block 128, which increments the non_time_cal_cnt by a value of 1 is then entered. Decision block 122, which was described earlier, is then entered.

Figure 8:
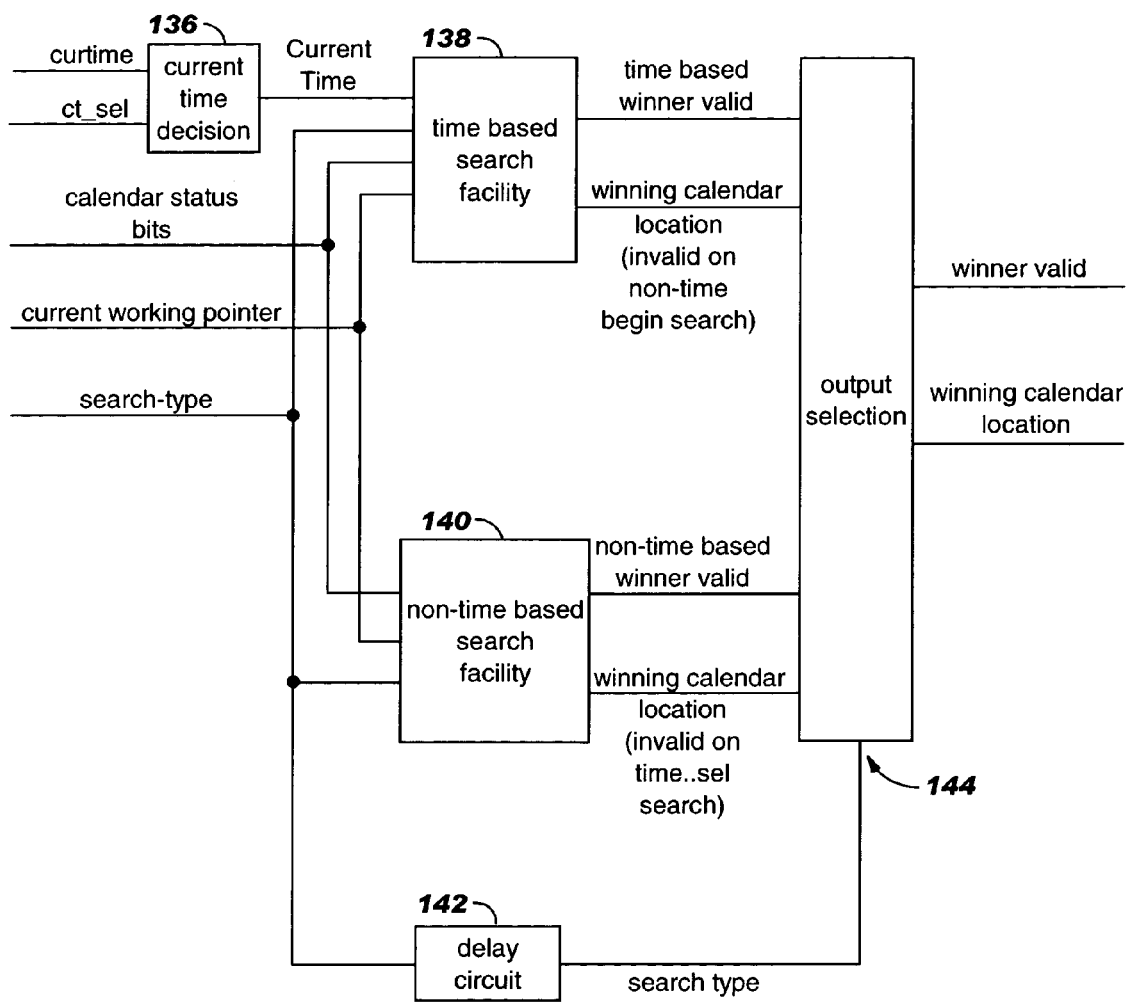
FIG. 8 shows a block diagram of the Calendar Search Engine.

FIG. 8 shows a block diagram for the Calendar Search Engine 54 (FIG. 5). The Calendar Search Engine 54 includes a time based search facility 138 and non-time based search facility 140. The output from the time based search facility 138 and the non-time based search facility 140 are outputted and selected through output selector 144 which is activated by the search type signal delayed a predefined amount by Delay Circuit 142. In the disclosed embodiment Delay Circuit 142 is set to a value of one clock cycle delay. Of course other clock cycle delays can be used depending on the designer's choice. The outputs from either the non-time based search algorithm 140 or time based search algorithm 138 are selected by the output selector 144 and output as Winner Valid and Winning Calendar Location information.

The time based search algorithm 138 is substantially identical to the search algorithm described in U.S. patent application Ser. No. 09/966,304 filed Sep. 27, 2001 by Darryl Rumph identified above and incorporated herein by reference to complete the description of this feature, if necessary. Likewise, the non-time based search algorithm 140 is substantially identical to the search algorithm described in U.S. patent application Ser. No. 10/242,151, filed Sep. 12, 2002 by Darryl Rumph, identified above and fully incorporated herein by reference to complete the detailed description of this feature, if necessary.

The Current Time input is generated by current time decision logic 136. For the current implementation, the current time input is a 20-bit value. Portions of this value are used as the value of current time for the time-based calendar searches. For this implementation, the 9-bit value of current time is chosen as a function of ct_sel: If ct_sel equals zero, then ct equals curr_time_in(8:0). If ct_sel equals one, then ct equals curr_time_in(12:4). If ct_sel equals two, then ct equals curr_time_in(16:8). Finally, if ct_sel equals 3, then ct equals curr_time_in(20:12).

The input control signals calendar status bit, current working pointer and search type signals have already been described and will not be repeated.

FIG. 9 shows Table I of the initialization routine which is done by the FSM 52 (FIG. 5). The table shows that the actions taken are performed on each structure of the system shown in FIG. 5. The first column in the table is labeled clock cycle number and indicates the clock cycle value at which actions are taken on the structure in FIG. 5. Column 2 lists the Array Location. As discussed above there are 52 arrays labeled 0 through 51 which are shown in the array location column. The third column labeled Array Names indicate the arrays that are serviced during the named clock cycle. The fourth column labeled Access Type indicates what is being done to the structure. In this case the structure is written into. Finally, the fifth column labeled Write Data indicates the data which is written into the named structure. By way of example, the first row of the table indicates that at cycle 1 of the clock, array 0 is being serviced and the calendar status array, the cp array and the winner array are each written with all zeroes. In a similar manner each line in the table can be explained and further explanation of the respective lines will not be given.

FIG. 10 shows Table II illustrating array accesses during a tick (20 clock cycles) TDM (Time Division Multiplexing) with neither attach or detach actions. During the period where there are no calendar attaches nor detaches immediately following initialization, there are no winners at the output. Therefore, the winner data output from the structure (Winner Valid Array 58) will indicate that there is not a valid winner at the end of the $20^{th}$ cycle and repeat until all items are attached to the calendar.

Still referring to FIG. 10 the headings are labeled Clock Cycle Number, Array Location, Array Names, Access Type, Write Data, Search Engine Inputs and Search Engine Output. The interpretation of these headings based upon previous discussion are self-explanatory and further details will not be given. The action taken on each machine cycle are also indicated in the Table, are self-explanatory and will not be discussed further.

FIG. 11 shows Table III illustrating type I search which has been identified and described above. The headings in the Table are labeled Clock Cycle Number, Array Location, Array Names, Access Type, Write Data, Search Engine Inputs, Search Engine Output and a Comments column. The headings in the first seven columns are self-explanatory and the information in the Comments column further explains activities taken relative to structures in FIG. 5. The entry in this table is also self-explanatory and further description will not be given. It should be noted that at the end of clock cycle 3 the output of the search is stored in the Winner Valid and Winning Location Arrays at address N.

FIG. 12 shows Table IV illustrating type II search. For a type II search an attach has occurred to a time based calendar at a specific calendar location. The type II search of calendar N where N is the address (number) of a time based calendar is shown in Table IV. The headings in Table IV are the same as the headings in Table III and will hot be repeated herein. At the end of three clock cycles the output of the type II search is stored in the Winner Valid and Winning Location arrays in address N. The array structure now contains the updates as a result of the attach.

FIG. 13 shows Table V illustrating type III search. For a type III search an attach has occurred to a non-time based calendar at a specific calendar location. Table V shows the detail of the type III search of calendar N, where N is the address of a time based calendar and the attach is initiated on clock cycle 1. At the end of clock cycle 3 the output of the type III search is stored in the Winner Valid and Winning Location Arrays in address N. The array structure now contains the update as a result of the attach.

FIG. 14 shows Table VI illustrating type IV search. For a type IV search, a detach has occurred to a time based calendar at a specific calendar location. The "last item being detached" (LIBD) input indicates whether the calendar status bit for the search is to be a logical 1 or logical 0. An LIBD equal to 1 means the status bit should be logical 0 for the search. LIBD equal to 0 means the status bit should be logical 1 for the search. Table VI shows the details of the type IV search of calendar N where N is the address of the time based calendar and the attach is initiated on clock cycle 1. At the end of clock cycle 4 the output of the type 4 search is stored in the Winner Valid and Winning Location Arrays in Address N. The array structures now contain the update as a result of the detach.

FIG. 15 shows Table VII illustrating type V search. For a type V search, a detach has occurred to a non-time based calendar at a specific calendar location. As for a type IV search discussed above, the "last item being detached" (LIBD) input indicates whether the calendar status bit for the search is to be a logical 1 or a logical 0. LIBD equal to 1 means a status bit should be logical 0 for the search. LIBD equal to 0 means the status bit should be logical 1 for the search. FIG. 15 shows the details of the type V search of calendar N, where N is the address of a time based calendar and the attached is initiated on clock cycle 1. At the end of clock cycle 4 the output of the type V search is stored in the Winner Valid and Winning Location Array in address M. The array structure now contains the updates as a result of the detach.

It should be noted that these actions which initiate accesses to the arrays are being pipelined, and care must be taken such that there is not a "collision" for access of the same resource on the same clock cycle. This is true for both read accesses and write accesses. Also, because of hardware limitations, it generally takes at least one clock cycle to access an array structure; so there is a requirement that there must be at least one system clock cycle between attaches and detaches.

Because of the finite amount of time required to access the winner array structure during the final decision process, there can be neither attaches nor detaches after cycle 18 of a tick period.

Figure 16:
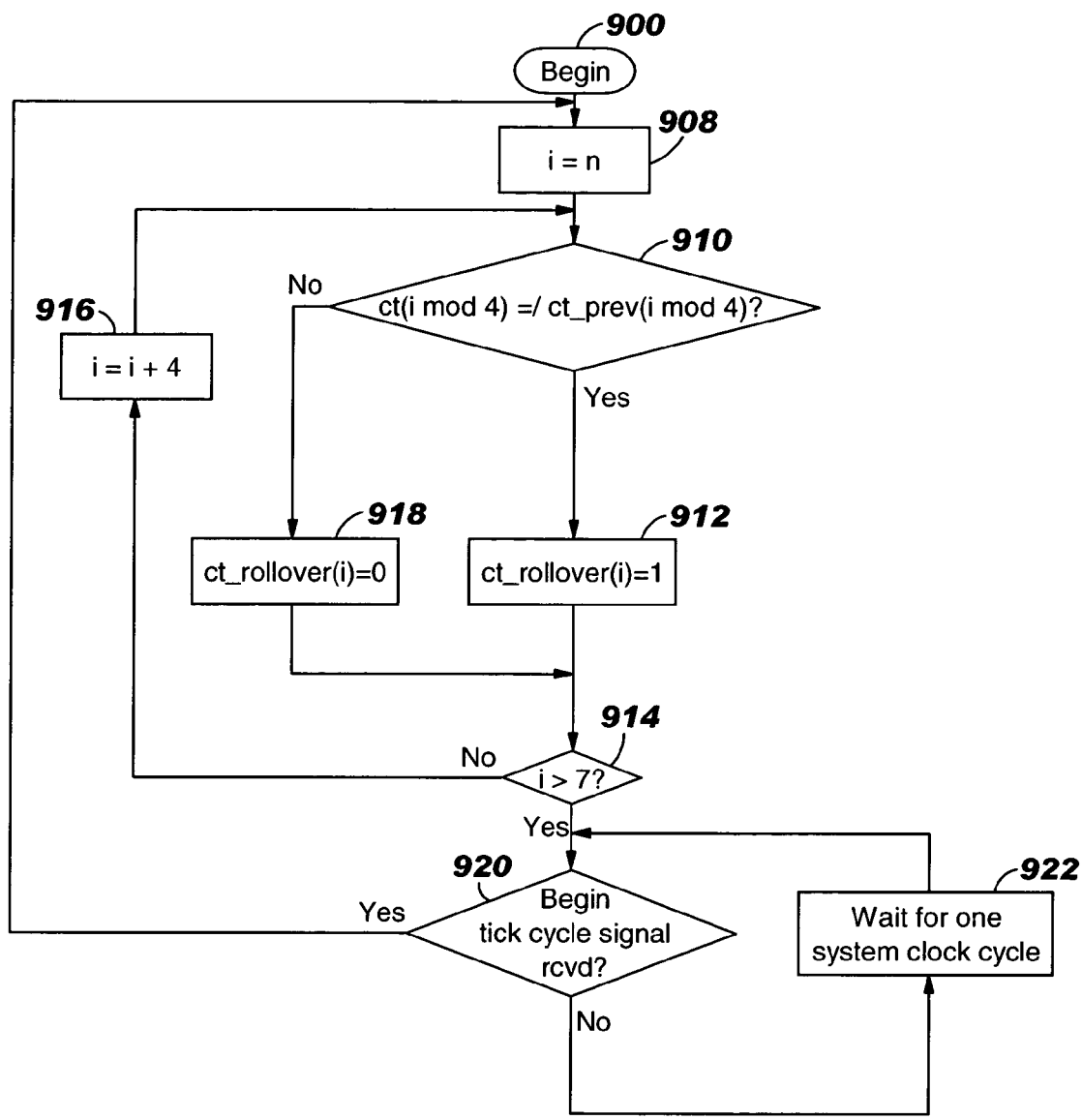
FIG. 16 shows a flowchart of the generation of the CT_Rollover signals.

FIG. 16 begins on block 900. Next block 908, which sets the value of variable i to the value of n, is then entered. Decision block 910, which asks if the value of CT for the calendar corresponding to i mod 4 is equal to the value of ct_prev for the same calendar, is entered. If the answer to block 910 is no, then block 918, which sets the value of the ct_rollover bus corresponding to bit position i to a value of zero, is entered. Next, decision block 914, which asks if the value of i is greater than 7, is entered. If the answer to block 910 is yes, then block 912, which sets the same bit position described in block 918 to a value of one, is entered. After block 912 is exited, block 914 is then entered.

If the answer to block 914 is no, then block 916, which increments the value of i by a value of four, is entered. Block 916 is exited and decision block 910 is then entered. If the answer to block 914 is yes, then decision block 920, which asks if the begin_tick_cycle_signal is active, is entered. If the answer to block 920 is no, then block 922, which waits for one system clock cycle, is entered. After exiting block 922, then block 920 is then re-entered. If the answer to block 920 is yes, then block 908, which is entered at the beginning of each tick cycle, is entered. It should be noted that this ct_rollover flowchart of FIG. 16 is replicated four times with the values of n for each instance being zero, one, two, and three.

It is to be understood that the above described embodiment is merely illustrative of the application of principles of the invention and that other arrangements or embodiments may be devised by someone skilled in the art without departing from the spirit and scope of the invention.

What is claimed is:

1. A method comprising acts of:
providing a scheduler including a plurality of calendars used to determine when a frame is to be moved from a flow queue;
providing at least one search engine to search the calendars;
defining a tic period within which searching is to be completed;
searching with a search engine the calendars so determined;
postponing search of any calendars so determined if postponed calendars could not be searched within the tic period;
wherein the act of determining calendars to be searched further includes the acts of:
providing a first register for storing bits indicating calendars whose current time (Ct) has changed during a tic cycle;
providing at least one counter with sufficient bits to count to $2^{m-1}$, where m=number of bits required to represent number of location in calendar;
providing at least one counter with sufficient location to count to log 2m, wherein log $2m=2^m=$max number of locations in a calendar;
stepping the counter in accordance with a predefined pattern; and adjusting contents of the first register based upon contents of the counter.

2. A method comprising acts of:

providing a scheduler including a plurality of calendars used to determine when a frame is to be moved from a flow queue;

providing at least one search engine to search the calendars;

defining a tic period within which searching is to be completed;

searching with the search engine the calendars so determined;

postponing search of any calendars so determined if postponed calendars could not be searched within the tic period;

tagging calendars whose search was postponed, wherein tagging further includes the acts of providing a register with positions corresponding to the plurality of calendars; and setting a bit in position corresponding to calendars whose search has been postponed in a particular tick cycle.

* * * * *